(12) United States Patent
O'Farrell

(10) Patent No.: US 6,181,729 B1
(45) Date of Patent: Jan. 30, 2001

(54) SPREAD SPECTRUM COMMUNICATION

(75) Inventor: Timothy O'Farrell, Leeds (GB)

(73) Assignee: Supergold Communication Limited, Limassol (CY)

( * ) Notice: Under 35 U.S.C. 154(b), the term of this patent shall be extended for 0 days.

(21) Appl. No.: 09/330,944

(22) Filed: Jun. 11, 1999

Related U.S. Application Data

(63) Continuation of application No. PCT/IE98/00110, filed on Dec. 18, 1998.

(30) Foreign Application Priority Data

Dec. 19, 1997 (IE) ........................................ S970900
Dec. 18, 1998 (IE) ........................................ S981071

(51) Int. Cl.[7] .................................................. H04B 1/69
(52) U.S. Cl. ........................ 375/130; 375/140; 708/250
(58) Field of Search ................................... 375/130, 140, 375/145, 149; 708/250, 254

(56) References Cited

U.S. PATENT DOCUMENTS 5,559,829    9/1996   Le Strat et al. .
6,091,760  * 7/2000   Giallorenzi et al. ................. 375/140

OTHER PUBLICATIONS

Mo–Han Fong, et al., "Concatenated Orthogonal/PN Spreading Scheme for Cellular DS–CDMA Systems with Integrated Traffic," Communications—Gateway to Globalization, Proceedings of the Conference on Communications, Seattle, Jun. 18–22, 1995, vol. 2, Jun. 18, 1995, pp. 905–909, Institute of Electrical and Electronics Engineers.

J. Das, "A Technique for Improving the Efficiency of M–ARY Signaling," *IEEE Transactions on Communications*, vol. COM–32, No. 2, Feb. 1984, pp. 199–201.

E. Le Strat, "New Spreading Codes for a DS–CDMA Mobile Radio System Using a Rake Receiver in a Multi–User Interference Environment," IEEE ISSSTA '94, Proceedings of IEEE 3rd International Symposium on Spread Spectrum Techniques and Applications, Oulu, Finland, Jul. 4–6, 1994, vol. 2, pp. 401–405.

T. O'Farrell, "New Signature Code Sequence Design Techniques for CDMA Systems," *Electronics Letters*, vol. 27, No. 4, Feb. 14, 1991, pp. 371–373.

* cited by examiner

*Primary Examiner*—Amanda T. Le
(74) *Attorney, Agent, or Firm*—Barry R. Lipsitz

(57) ABSTRACT

Spread spectrum communication techniques and applications using signature sequences are described to reduce the effects of certain transmission impairments such as co-channel interference, multiple access interference and intersymbol interference. Signature sequences with structured properties are obtained by generating cosets from a seed set of sequences, constructing a subset of sequences by concatenating the sequences of a coset and constructing a full set of sequences by concatenating the subsets of sequences.

34 Claims, 11 Drawing Sheets

SPREAD SPECTRUM COMMUNICATION

This application is a Continuation PCT/IE98/00110 filed Dec. 18, 1998.

BACKGROUND OF THE INVENTION

The present invention relates to spread spectrum communication and more particularly, to spread spectrum communication techniques and applications using signature sequences.

Spread spectrum communication techniques are used for information carrying signals in a variety of communication systems because of their ability to reduce the effects of certain transmission impairments. Many multi-user communication techniques suffer co-channel interference, multiple access interference and intersymbol interference. The use of spread spectrum transmission and reception attenuates these interference types.

In Local Area Networks (LANs) there is an increasing desire to extend or replace wired LANs in order to increase functionality and maximise the number of potential applications for such systems. This trend facilitates the growing need for wireless access. This wireless access allows mobile computer users to remain in contact with a given corporate LAN over short distances. Currently available systems provide such connections using either radio or infrared communication technology. For certain system requirements, this communication is adequate. However, the application of such technologies to wireless LANs is relatively new and therefore can prove to be both expensive and unreliable. Furthermore, the data transmission rates achievable are relatively low which significantly limits the number of applications to which the systems may be applied. Coverage of a large area using infrared technology is particularly expensive, even more expensive than the radio communication equivalent. While point-to-point or line-of-sight infrared technology is cheaper than radio technology, it is unsuitable for most wireless LANs.

The main constraint on using any wireless LAN is interference. Infrared transmission particularly suffers from inter-symbol interference produced by multipath propagation effects. Achieving full coverage in an operating environment, while keeping within the limits of eye safety presents another problem to system designers, as does contending with interference produced by natural and man-made light sources that might be present. A further problem occurs when designing infrared receivers for such systems in that the receivers must provide the required sensitivity and bandwidth at minimal cost.

Achieving full room coverage while avoiding multipath propagation are conflicting requirements in a wireless infra-red LAN and full room coverage is essential if reliable communication to and from any point within the room is needed. In order to achieve full room coverage, it is necessary to diffuse the transmitted infrared radiation. While diffuse transmission will reflect off walls and ceilings to fill the room the signal power reaching a given receiver is usually very small necessitating the use of very sensitive receivers. The problem of sensitivity is compounded by the necessity to detect a weak information bearing signal in strong interference. As a result of these problems there are few commercial infrared wireless LANs or associated systems available on the market.

Commercially available systems therefore tend to use elaborate structures and circuitry, which are expensive when compared with radio technologies. While there is a dearth of infrared technologies that support multi-user communication, there are numerous infrared technologies that support directed line-of-sight transmission. The most commonly available of these is the infrared serial port link based on the Infrared Data Association (IrDA) Standard. IrDA links can operate at data rates up to 4 Mb/s and are used in relatively inexpensive IrDA access points. However, IrDA links are only guaranteed to operate over a one meter range and are limited generally to one-to-one communication. IrDA is primarily intended as a replacement for a single wire-connection and is not intended for multi-user access. Notwithstanding this limitation, the popularity of IrDA clearly illustrates the enormous demand for reliable wireless technology. The best way to achieve multi-user links is to flood the operating environment with infrared light. While this enables multiple-users to connect to a network from anywhere in the operating environment, significant power is lost in such a diffuse environment thereby compromising the signal-to-noise ratio (SNR) at the receiver.

BRIEF SUMMARY OF THE INVENTION

It is an object of the present invention to seek to provide a method and apparatus for the generation of signature sequences for spread spectrum communication, which will overcome the aforementioned problems. It is a further object of the invention to provide transmitter and receiver circuitry for coded spread spectrum signals.

Accordingly, the present invention provides a method of constructing signature sequences for spread spectrum communication techniques, the method comprising:

selecting a seed set of sequences;

forming cosets from the seed set of sequences;

constructing a subset of sequences by concatenating the sequences of a coset; and constructing a full set of sequences by concatenating subsets of sequences.

The invention further provides an apparatus for constructing and encoding signature sequences for spread spectrum communication techniques, the apparatus comprising:

a seed set generating means for constructing a seed set of sequences;

a coset generating means for generating cosets of sequences;

an expansion means which concatenates the sequences of a coset according to a predetermined order to form a subset of sequences for each coset; and a set generating means for constructing a full set of sequences by concatenating subsets.

Conveniently, the seed set generating means comprises a plurality of shift registers each having an input, a system clock input, logic gates, a plurality of register cells/stages and an output to form a sequence of the seed set. A typical seed set generating means is constructed from a number of linear feedback shift registers.

The cosets are formed from the seed set utilising biphase multiplication techniques, preferably by multiplication of each sequence of the seed set by a sequence element for each element of the corresponding sequence.

The expansion means comprises a plurality of inputs, each one corresponding to a sequence from a coset, multiplexers, counters, logic gates, a system clock input and a plurality of outputs to form a subset of sequences.

The set generating means comprises a plurality of shift registers each having an input, a system clock input and a plurality of register cells/stages with outputs to form the full set of sequences.

Preferably, the seed set generating means, the coset generating means, the expansion means and the full set generating means are realisable utilising electronic circuitry, including memory devices such as registers, ASICs or FPLAs. Optionally, the means are realisable utilising dedicated software techniques.

The present invention also provides an apparatus for decoding signature sequences in a spread spectrum communications system, the apparatus comprising:

means for receiving coded signals;

means for generating sequence functions;

means for combining received coded signals with sequence functions to produce despread signal outputs;

means for combining the despread signal outputs to generate a data stream; and logic circuitry for analysing the data stream.

The invention yet further provides transmitter and receiver circuits including the encoding and decoding apparatus described hereinabove, respectively, each circuit being adapted for use with the signature sequences of the present invention.

In a first exemplifying embodiment, an infrared communications system for a wireless local area network comprises a plurality of remote communication terminals, each terminal including a transmitter circuit having means for generating and encoding signature sequences for spread spectrum communication techniques, a means for transmitting coded infrared signals and a receiver circuit for receiving coded infrared signals having means for decoding signature sequences in a spread spectrum communication system.

In a second exemplifying embodiment, a radio communication system for a wireless local area network comprises a plurality of remote communication terminals, each terminal including a transmitter circuit having means for generating and encoding signature sequences for spread spectrum communication techniques, a means for transmitting coded radio signals and a receiver circuit for receiving coded radio signals having means for decoding signature sequences in a spread spectrum communication system.

In a third exemplifying embodiment, a radio code division multiple access (CDMA) communication system for use, for example, in cellular mobile radio networks, wireless local loop networks, radio packet data networks or satellite networks comprises a plurality of remote communication terminals that send and receive radio signals to and from, respectively, a central base station. Each base station has transmitter circuits having means for generating and encoding signature sequences for CDMA communication techniques, a means for transmitting coded radio signals and receiver circuits for receiving coded radio signals having means for decoding signature sequences in a radio CDMA communication system. Each remote terminal has a transmitter circuit having means for generating and encoding signature sequences for CDMA communication techniques, a means for transmitting coded radio signals and a receiver circuit for receiving coded radio signals having means for decoding signature sequences in a CDMA communication system.

In a fourth exemplifying embodiment, a lightwave CDMA communication system for an optical fibre local area network comprises a plurality of remote communication terminals that transmit and receive lightwave signals and which are interconnected by optical fibre. Each terminal has a transmitter circuit having means for generating and encoding signature sequences for lightwave CDMA communication techniques, a means for transmitting coded lightwave signals and a receiver circuit for receiving a coded lightwave signals having means for decoding signature sequences in a lightwave CDMA communication system.

The term "lightwave" is taken to mean electromagnetic radiation within the ranges of visible light and near and far infrared light.

According to one aspect of the invention there is provided a method for spread spectrum communication using a signature sequence, the signature sequence being generated by performing the steps of:

selecting a seed set of sequences of a given size;

generating a plurality of cosets from the seed set of sequences;

constructing a subset of sequences by concatenating the sequences of a coset; and constructing a full set of sequences by concatenating subsets of sequences.

Preferably, the seed set contains binary sequences.

Preferably, the binary sequence is cyclically distinct, quasi-balanced and satisfies the optimal periodic autocorrelation condition.

In one arrangement, the seed set contains complex sequences.

Preferably, the seed set incorporates a plurality of inner sequences.

Preferably, the seed set is orthogonal.

Ideally, the cosets are generated by multiplying in turn each inner sequence by an element of an associated sequence.

Preferably, the subset of sequences is constructed by concatenating the sequences of a coset using an addition table.

In one embodiment of the invention, the addition table is constructed using powers of a primitive root of the seed set of sequences, the primitive root being determined in accordance with the size of the seed set.

In another embodiment of the invention, the addition table is constructed using powers of a primitive element of the seed set of sequences, the primitive element being determined in accordance with the size of the seed set.

Preferably, the seed set is formed from a plurality of rotated sequences.

According to another aspect of the invention there is provided a method for producing a structured code for use in spread spectrum data communication comprising the steps of:

selecting a seed set of sequences of a given size;

generating a plurality of cosets from the seed set of sequences;

constructing a subset of sequences by concatenating the sequences of a coset; and constructing a full set of sequences by concatenating subsets of sequences.

Preferably, the seed set contains binary sequences.

Preferably, the binary sequence is cyclically distinct, quasi-balanced and satisfies the optimal periodic autocorrelation condition.

In one arrangement, the seed set contains complex sequences.

Ideally, the seed set incorporates a plurality of inner sequences.

Preferably, the seed set is orthogonal.

In a preferred embodiment, the cosets are generated by multiplying in turn each inner sequence by an element of an associated sequence.

Preferably, the subset of sequences is constructed by concatenating the sequences of a coset using an addition table.

In one arrangement, the addition table is constructed using powers of a primitive root of the seed set of sequences, the primitive root being determined in accordance with the size of the seed set.

In another arrangement, the addition table is constructed using powers of a primitive element of the seed set of sequences, the primitive element being determined in accordance with the size of the seed set.

Preferably, the seed set is formed from a plurality of rotated sequences.

According to a further aspect of the invention there is provided an apparatus for constructing and encoding signature sequences for spread spectrum communication techniques, the apparatus comprising:

a seed set generating means for constructing a seed set of sequences;

a coset generating means for generating cosets of sequences;

an expansion means for concatenating sequences of a generated coset according to a predetermined order, to form a subset of sequences for each coset; and a set generating means for constructing a full set of sequences by concatenating subsets.

Preferably, the seed set generating means comprises a plurality of shift registers, each shift register having an input, a system clock input, logic gates, a plurality of register cells/stages and an output to form a sequence of the seed set.

Preferably, the seed set generating means includes a number of linear feedback shift registers.

In one arrangement, the expansion means comprises:

a plurality of inputs, each input corresponding to a sequence from a coset;

a plurality of multiplexers having associated counters and logic gates;

a system clock input; and a plurality of outputs to form a subset of sequences.

Preferably the apparatus is formed for decoding signature sequences in a spread spectrum communications system, the apparatus comprising:

means for receiving coded signals;

means for generating sequence functions;

means for combining received coded signals with sequence functions to produce despread signal outputs;

means for combining the despread signal outputs to generate a data stream; and logic circuitry for analysing the data stream.

According to a further aspect of the invention there is provided, a data transmission system having a transmitter and a receiver, the transmitter incorporating means for transmitting data using a signature sequence and the receiver formed for receiving and decoding data transmitted using a signature sequence, the signature sequence being generated by performing the steps of:

selecting a seed set of sequences of a given size;

generating a plurality of cosets from the seed set of sequences;

constructing a subset of sequences by concatenating the sequences of a coset; and constructing a full set of sequences by concatenating subsets of sequences.

According to a still further aspect of the invention there is provided, an electromagnetic radiation or sonic communications system for a communications network comprising a plurality of remote communication terminals, each terminal including a transmitter circuit having means for generating and encoding signature sequences for spread spectrum communication techniques by performing the steps of selecting a seed set of sequences of a given size, generating a plurality of cosets from the seed set of sequences, constructing a subset of sequences by concatenating the sequences of a coset and constructing a full set of sequences by concatenating subsets of sequences, the transmitter circuit also having, a means for transmitting coded signals and a receiver circuit for receiving coded signals the receiver circuit having means for decoding signature sequences in a spread spectrum communication system.

Preferably, the communications network uses a radio frequency carrier, an ultrasound carrier, a seismic carrier or a lightwave or infrared carrier.

Preferably, the receiver circuit incorporates a photodetector, the photodetector having an associated coupling means communicating with a receiver preamplifier.

Preferably, the coupling means is formed for differential signal recognition.

Ideally, the seed set is a balanced seed set.

In a preferred arrangement, the encoding signature sequences incorporates orthogonal structured codes.

According to particularly advantageous aspect of the invention there is provided a communications method for transmission of data in a network using a unipolar-bipolar signaling scheme, the scheme having code division means for separating differential data on a unipolar or bipolar transmission channel.

Preferably, the code division means utilises a binary sequence.

Ideally, the binary sequence is orthogonal.

Preferably, the communications method for transmission of data incorporates means for integrating an M-ary digital transmission scheme based on orthogonal structured codes.

The invention will now be described more particularly with reference to the accompanying drawings, which show, by way of example only, communication systems utilising signature sequences in spread spectrum communication techniques according to the invention as exemplified by four embodiments.

BRIEF DESCRIPTION OF THE SEVERAL VIEWS OF THE DRAWING(S)

DETAILED DESCRIPTION OF THE INVENTION

Figure 1:
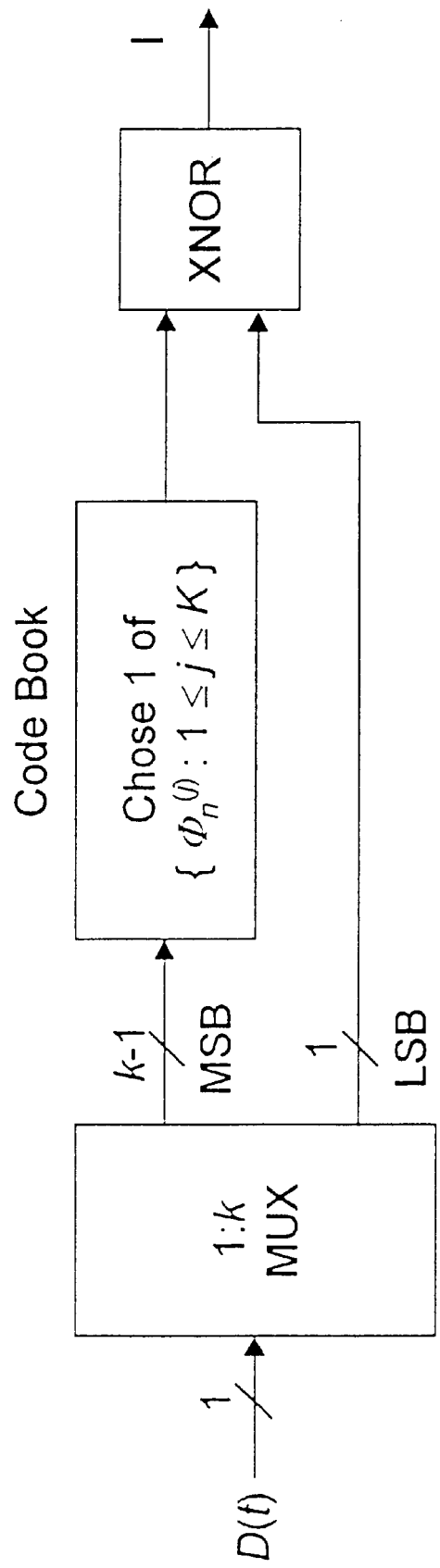
FIG. 1 is a schematic diagram of a transmitter based on M-ary bi-orthogonal keying for use in a spread spectrum communication system.

The method for constructing or generating signature sequences will now be presented. In general, sequence elements may be binary or non-binary, real or complex, quadriphase or polyphase etc. with corresponding mathematical operations being performed accordingly. In the present disclosure binary sequences are used by way of example. A binary sequence with elements $\epsilon$ $\{1,0\}$ is mapped into a biphase sequence with elements $\epsilon$ $\{-1,1\}$ by using the assignment $(1 \to -1)$ and $(0 \to 1)$. Then, modulo-2 addition between binary sequences is achieved by biphase multiplication between the corresponding biphase sequences. In order to facilitate explanations, the following notation has been adopted throughout. A biphase sequence $\{a_n\}$ has elements $a_n \in \{-1,1\}$. However, for simplicity in the description of sequence generation hereinafter, the biphase notation $a_n \in \{-,+\}$ is used where symbol "−" refers to "−1" and the symbol "+" refers to "+1". Furthermore, we denote a sequence of length w by $\{a_n\}=(a_0, a_1, a_2, \ldots a_{w-1})$ while $\{a^{(m)}\}$ denotes a set of sequences $\{a_n^{(0)}\}, \{a_n^{(1)}\}, \{a_n^{(2)}\}, \ldots \{a_n^{(m-1)}\}$ each of length w. Typically, the sequences belonging to the set $\{a^{(m)}\}$ are periodic in w, however, this does not always needs to be the case.

New Structured Codes presented hereinafter are a significant development beyond the structured codes described in the prior art. The name Structured Code is a generic name simply referring to the structured nature of these sequences. In the present application, the complete algorithms for constructing Structured Codes are presented for the first time. In addition, specific sets of sequences suitable for spread spectrum systems are presented.

The procedure for constructing a set of Structured Codes is described below. The sequence set $\{a^{(m)}\}$ specifies a set of m inner sequences $\{a_n^{(0)}\}, \{a_n^{(1)}\}, \{a_n^{(2)}\}, \ldots \{a_n^{(m-1)}\}$ each of length w, where m is an integer. Then the number of available seed sets is equal to the number of combinations of m sequences from a total of $2^w$ sequences (i.e. $2^w!/m!(2^w-m)!$) which can be very large. The sequence set $\{a^{(m)}\}$ is referred to as the seed set and is illustrated below.

| $\{a^{(m)}\}$ | Seed Set |
| --- | --- |
| $\{a_n^{(0)}\}$ | $(a_0^{(0)}, a_1^{(0)}, a_2^{(0)}, \ldots a_{w-1}^{(0)})$ |
| $\{a_n^{(1)}\}$ | $(a_0^{(1)}, a_1^{(1)}, a_2^{(1)}, \ldots a_{w-1}^{(1)})$ |
| $\{a_n^{(2)}\}$ | $(a_0^{(2)}, a_1^{(2)}, a_2^{(2)}, \ldots a_{w-1}^{(2)})$ |
| . | . |
| . | . |
| $\{a_n^{(m-1)}\}$ | $(a_0^{(m-1)}, a_1^{(m-1)}, a_2^{(m-1)}, \ldots a_{w-1}^{(m-1)})$ |

The seed set $\{a^{(m)}\}$ is used to construct w cosets where the i-th coset, denoted by $\{c^{(m)}\}_i$ for $0 \leq i \leq w-1$, is constructed by multiplying each sequence of $\{a^{(m)}\}$ by the i-th element, $a_i^{(\cdot)}$, of the corresponding sequence as illustrated below where each coset contains m sequences each of length w.

| $\{c^{(m)}\}_i$ | | i-th Coset for $0 \leq i \leq w-1$ |
| --- | --- | --- |
| $\{c_n^{(0)}\}_i$ | $a_i^{(0)} \times \{a_n^{(0)}\}$ | $a_i^{(0)} \times (a_0^{(0)}, a_1^{(0)}, a_2^{(0)}, \ldots a_{w-1}^{(0)})$ |
| $\{c_n^{(1)}\}_i$ | $a_i^{(1)} \times \{a_n^{(1)}\}$ | $a_i^{(1)} \times (a_0^{(1)}, a_1^{(1)}, a_2^{(1)}, \ldots a_{w-1}^{(1)})$ |
| $\{c_n^{(2)}\}_i$ | $a_i^{(2)} \times \{a_n^{(2)}\}$ | $a_i^{(0)} \times (a_0^{(2)}, a_1^{(2)}, a_2^{(2)}, \ldots a_{w-1}^{(2)})$ |
| . | . | . |
| . | . | . |
| $\{c_n^{(m-1)}\}_i$ | $a_i^{(m-1)} \times \{a_n^{(m-1)}\}$ | $a_i^{(m-1)} \times (a_0^{(m-1)}, a_1^{(m-1)}, a_2^{(m-1)}, \ldots a_{w-1}^{(m-1)})$ |

The i-th subset of sequences, denoted by $\{b^{(q)}\}_i$, is constructed by concatenating the sequences of the i-th coset, $\{c^{(m)}\}_i$, according to a predefined order, where a subset contains q sequences $\{b_k^{(\cdot)}\}$ each of length $N=q \times w$. The order by which sequences of a coset are concatenated is determined by an Addition table constructed on the powers of a primitive root or primitive element using modular arithmetic and a finite set of integers or polynomials determined by the value of m. The construction of Addition tables is illustrated by way of example below. Finally, a set of Structured Codes, denoted by $\{s^{(N)}\}$, is constructed by sequentially concatenating the w subsets $\{b^{(q)}\}_i$ for $0 \leq i \leq w-1$. A set of Structured Codes contains N sequences each of length $N=q \times w$. Structured Codes are constructed for three conditions depending on m.

When the seed set is square, that is m=w, an alternative construct for generating cosets can be used. Since m=w in this alternative construct then the seed set $\{a^{(w)}\}$ is used to construct w cosets where the i-th coset, denoted by $\{c^{(w)}\}_i$ for $0 \leq i \leq w-1$, is constructed by multiplying each sequence of $\{a^{(w)}\}$ by the i-th element, $a_i^{(x)}$, of the same sequence as illustrated below where each coset contains m=w sequences each of length w.

| $\{c^{(w)}\}_i$ | | i-th Coset for $0 \leq i \leq w-1$ |
| --- | --- | --- |
| $\{c_n^{(0)}\}_i$ | $a_0^{(i)} \times \{a_n^{(0)}\}$ | $a_i^{(0)} \times (a_0^{(0)}, a_1^{(0)}, a_2^{(0)}, \ldots a_{w-1}^{(0)})$ |
| $\{c_n^{(1)}\}_i$ | $a_1^{(i)} \times \{a_n^{(1)}\}$ | $a_i^{(1)} \times (a_0^{(1)}, a_1^{(1)}, a_2^{(1)}, \ldots a_{w-1}^{(1)})$ |
| $\{c_n^{(2)}\}_i$ | $a_2^{(i)} \times \{a_n^{(2)}\}$ | $a_i^{(0)} \times (a_0^{(2)}, a_1^{(2)}, a_2^{(2)}, \ldots a_{w-1}^{(2)})$ |
| . | . | . |
| . | . | . |
| $\{c_n^{(m-1)}\}_i$ | $a_{w-1}^{(i)} \times \{a_n^{(w-1)}\}$ | $a_{w-1}^{(i)} \times (a_0^{(w-1)}, a_1^{((w-1))}, a_2^{(w-1)}, \ldots a_{w-1}^{(w-1)})$ |

The construction of a full set of structured codes then follows as before.

Condition 1: "m=odd prime integer"

The procedure for constructing a set of Structured Codes is illustrated by way of example when m=5. Firstly, a seed set $\{a^{(5)}\}$ is selected as illustrated below.

| $\{a^{(5)}\}$ | Seed Set |
| --- | --- |
| $\{a_n^{(0)}\}$ | ++++− |
| $\{a_n^{(1)}\}$ | +++−+ |
| $\{a_n^{(2)}\}$ | ++−++ |
| $\{a_n^{(3)}\}$ | +−+++ |
| $\{a_n^{(4)}\}$ | −++++ |

In this example, each sequence in the seed set has length w=5. We construct w=5 cosets using the described above for i=0, 1, 2, 3 and 4 as illustrated below.

| $Z_m$ | $\{c^{(5)}\}_i$ | $\{c^{(5)}\}_0$ | $\{c^{(5)}\}_1$ | $\{c^{(5)}\}_2$ | $\{c^{(5)}\}_3$ | $\{c^{(5)}\}_4$ |
|---|---|---|---|---|---|---|
| 0 | $\{c_n^{(0)}\}_i$ | ++++− | ++++− | ++++− | ++++− | −−−−+ |
| 1 | $\{c_n^{(1)}\}_i$ | +++−+ | +++−+ | +++−+ | −−−+− | +++−+ |
| 2 | $\{c_n^{(2)}\}_i$ | ++−++ | ++−++ | −−+−− | ++−++ | ++−++ |
| 3 | $\{c_n^{(3)}\}_i$ | +−+++ | −+−−− | +−+++ | +−+++ | +−+++ |
| 4 | $\{c_n^{(4)}\}_i$ | +−−−− | −++++ | −++++ | −++++ | −++++ |

When m is an odd prime, the integer residue class $Z_m=\{0, 1, 2, \ldots m-1\}$ form a Galois field, GF(m), with respect to addition and multiplication modulo m. If a is a primitive root of m then there are $\phi(m)=m-1$ residue integers $Z_l$ relatively prime to m, (i.e. gcd(l, m)=1), which can be used to construct an Addition table A(q), where $q=\phi(m)+1$ and $\phi(.)$ is the Euler totient function. When a is a primitive root of m then the powers of a, namely $a^0, a^1, a^2, \ldots a^{m-2}$, are all distinct modulo m and correspond to the non-zero residue integers $Z_l$.

That is, each residue integer $Z_l$ can be expressed as a power of the primitive root a. Correspondingly, an Addition table over GF(m) based on the powers of a modulo m can be constructed. Thus, a=2 is a primitive root of m=5 and the powers of a modulo m are $(a^0, a^1, a^2, a^3)=(1, 2, 4, 3)$. Hence, $q=\phi(5)+1=5$ and the corresponding Addition table A(5) is illustrated below.

| + | | 0 | $a^0$ | $a^1$ | $a^2$ | $a^3$ |
|---|---|---|---|---|---|---|
| | | 0 | 1 | 2 | 4 | 3 |
| 0 | 0 | 0 | 1 | 2 | 4 | 3 |
| $a^0$ | 1 | 1 | 2 | 3 | 0 | 4 |
| $a^1$ | 2 | 2 | 3 | 4 | 1 | 0 |
| $a^2$ | 4 | 4 | 0 | 1 | 3 | 2 |
| $a^3$ | 3 | 3 | 4 | 0 | 2 | 1 |

Addition table-1 over GF(5) for $\alpha = 2$

We construct a subset $\{b^{(q)}\}_i$ corresponding to each coset $\{c^{(m)}\}_i$ by concatenating the sequences of $\{c^{(m)}\}_i$ according to the rows of the Addition table A(5) as illustrated below.

| $\{b^{(5)}\}_i$ | i-th Subset for $0 \leq i \leq w - 1$ |
|---|---|
| $\{b_k^{(0)}\}_i$ | $\{c_n^{(0)}\}_i\{c_n^{(1)}\}_i\{c_n^{(2)}\}_i\{c_n^{(4)}\}_i\{c_n^{(3)}\}_i$ |
| $\{b_k^{(1)}\}_i$ | $\{c_n^{(1)}\}_i\{c_n^{(2)}\}_i\{c_n^{(3)}\}_i\{c_n^{(0)}\}_i\{c_n^{(4)}\}_i$ |
| $\{b_k^{(2)}\}_i$ | $\{c_n^{(2)}\}_i\{c_n^{(3)}\}_i\{c_n^{(4)}\}_i\{c_n^{(1)}\}_i\{c_n^{(0)}\}_i$ |
| $\{b_k^{(3)}\}_i$ | $\{c_n^{(4)}\}_i\{c_n^{(0)}\}_i\{c_n^{(1)}\}_i\{c_n^{(3)}\}_i\{c_n^{(2)}\}_i$ |
| $\{b_k^{(4)}\}_i$ | $\{c_n^{(3)}\}_i\{c_n^{(4)}\}_i\{c_n^{(0)}\}_i\{c_n^{(2)}\}_i\{c_n^{(1)}\}_i$ |

The subsets $\{b^{(5)}\}_i$ for i=0, 1, 2, 3 and 4 are illustrated below.

| $\{b^{(5)}\}_0$ | Subset 0 | | | | |
|---|---|---|---|---|---|
| $\{b_k^{(0)}\}_0$ | ++++− | +++−+ | ++−++ | +−−−− | +−+++ |
| $\{b_k^{(1)}\}_0$ | +++−+ | ++−++ | +−+++ | ++++− | +−−−− |
| $\{b_k^{(2)}\}_0$ | ++−++ | +−+++ | +−−−− | +++−+ | ++++− |
| $\{b_k^{(3)}\}_0$ | +−−−− | ++++− | +++−+ | +−+++ | ++−++ |
| $\{b_k^{(4)}\}_0$ | +−+++ | +−−−− | ++++− | ++−++ | +++−+ |

| $\{b^{(5)}\}_1$ | Subset 1 | | | | |
|---|---|---|---|---|---|
| $\{b_k^{(0)}\}_1$ | ++++− | +++−+ | ++−++ | −++++ | −+−−− |
| $\{b_k^{(1)}\}_1$ | +++−+ | ++−++ | −+−−− | −++++ | −++++ |
| $\{b_k^{(2)}\}_1$ | ++−++ | −+−−− | −++++ | +++−+ | ++++− |
| $\{b_k^{(3)}\}_1$ | −++++ | ++++− | +++−+ | −+−−− | ++−++ |
| $\{b_k^{(4)}\}_1$ | −+−−− | −++++ | ++++− | ++−++ | +++−+ |

| $\{b^{(5)}\}_2$ | Subset 2 | | | | |
|---|---|---|---|---|---|
| $\{b_k^{(0)}\}_2$ | ++++− | +++−+ | −−+−− | −++++ | +−+++ |
| $\{b_k^{(1)}\}_2$ | +++−+ | −−+−− | +−+++ | ++++− | −++++ |
| $\{b_k^{(2)}\}_2$ | −−+−− | +−+++ | −++++ | +++−+ | ++++− |
| $\{b_k^{(3)}\}_2$ | −++++ | ++++− | +++−+ | +−+++ | −−+−− |
| $\{b_k^{(4)}\}_2$ | +−+++ | −++++ | ++++− | −−+−− | +++−+ |

| $\{b^{(5)}\}_3$ | Subset 3 | | | | |
|---|---|---|---|---|---|
| $\{b_k^{(0)}\}_3$ | ++++− | −−−+− | ++−++ | −++++ | +−+++ |
| $\{b_k^{(1)}\}_3$ | −−−+− | ++−++ | +−+++ | ++++− | −++++ |
| $\{b_k^{(2)}\}_3$ | ++−++ | +−+++ | −++++ | −−−+− | ++++− |
| $\{b_k^{(3)}\}_3$ | −++++ | ++++− | −−−+− | +−+++ | ++−++ |
| $\{b_k^{(4)}\}_3$ | +−+++ | −++++ | ++++− | ++−++ | −−−+− |

| $\{b^{(5)}\}_4$ | Subset 4 | | | | |
|---|---|---|---|---|---|
| $\{b_k^{(0)}\}_4$ | −−−−+ | +++−+ | ++−++ | −++++ | +−+++ |
| $\{b_k^{(1)}\}_4$ | +++−+ | ++−++ | +−+++ | −−−−+ | −++++ |
| $\{b_k^{(2)}\}_4$ | ++−++ | +−+++ | −++++ | +++−+ | −−−−+ |
| $\{b_k^{(3)}\}_4$ | −++++ | −−−−+ | +++−+ | +−+++ | ++−++ |
| $\{b_k^{(4)}\}_4$ | +−+++ | −++++ | −−−−+ | ++−++ | +++−+ |

Finally, a set of Structured Codes $\{s^{(N)}\}$, which contains N outer sequences, $\{s_k^{(\cdot)}\}$, each of length N where $N=q \times w=25$, is constructed by sequentially concatenating the subsets $\{b^{(5)}\}_i$ for i=0, 1, 2, 3 and 4 as illustrated below.

| $\{s^{(25)}\}$ | Set of Structured Codes |
|---|---|
| $\{s_k^{(0)}\}$ | ++++−+++−+++−+++−−−−+−+++ |
| $\{s_k^{(1)}\}$ | +++−+++−+++−+++++++−+−−−− |
| $\{s_k^{(2)}\}$ | ++−+++−++++−−−−+++−++++− |
| $\{s_k^{(3)}\}$ | +−−−−++++−+++−++−++++++++ |
| $\{s_k^{(4)}\}$ | +−++++−−−−++++−++++−+ |
| $\{s_k^{(5)}\}$ | ++++−++++−++−++−++++−+−−− |
| $\{s_k^{(6)}\}$ | +++−+++−++−+−−−−++++−++++ |
| $\{s_k^{(7)}\}$ | ++−++−+−−−−+++++++−++++− |
| $\{s_k^{(8)}\}$ | −++++++++−+++−+−+−−−−++−++ |
| $\{s_k^{(9)}\}$ | −+−−−−+++++++−++−++−+++++ |
| $\{s_k^{(10)}\}$ | ++++−+++−+−−+−−−−++++−+++ |
| $\{s_k^{(11)}\}$ | +++−+−−+−−+−+++++++−−−++++ |
| $\{s_k^{(12)}\}$ | −−+−−+++−++++++++−++++− |
| $\{s_k^{(13)}\}$ | −++++++++−+++−+−−−+++−+− |
| $\{s_k^{(14)}\}$ | +−+++−+++++++++−−−+−−+++− |
| $\{s_k^{(15)}\}$ | ++++−−−−+−++−++−+++++−+++ |
| $\{s_k^{(16)}\}$ | −−−+−++−++++++−++−+++−+++ |
| $\{s_k^{(17)}\}$ | ++−++−+++−++++−−−+−+++− |
| $\{s_k^{(18)}\}$ | −++++++++++−−−−+−++++++−++ |
| $\{s_k^{(19)}\}$ | +−+++−++++++−++−++−−−+− |
| $\{s_k^{(20)}\}$ | −−−−++++−+++−++−+++++−+++ |
| $\{s_k^{(21)}\}$ | +++−+++−+++−+++−−−−+−++++ |
| $\{s_k^{(22)}\}$ | ++−+++−+++−+++++++−+−−−−+ |
| $\{s_k^{(23)}\}$ | −++++−−−−++++−++−++++−++ |
| $\{s_k^{(24)}\}$ | +−+++−++++−−−−+++−++++−+ |

For the primitive root a=2 we can construct another three distinct Addition tables over GF(5). Firstly, the Multiplication table over GF(5) based on the powers of a modulo m is constructed. Secondly, each non-zero row of the Multiplication table is used to construct a distinct Addition table. The first non-zero row of the Multiplication table constructs Addition table-1 used above while the following three non-zero rows construct another three distinct Addition tables as illustrated below.

| × | | 0<br>0 | $a^0$<br>1 | $a^1$<br>2 | $a^2$<br>4 | $a^3$<br>3 |
|---|---|---|---|---|---|---|
| 0 | 0 | 0 | 0 | 0 | 0 | 0 |
| $a^0$ | 1 | 0 | 1 | 2 | 4 | 3 |
| $a^1$ | 2 | 0 | 2 | 4 | 3 | 1 |
| $a^2$ | 4 | 0 | 4 | 3 | 1 | 2 |
| $a^3$ | 3 | 0 | 3 | 1 | 2 | 4 |

Multiplication table-1 over GF(5) for $\alpha = 2$

| + | 0 | 2 | 4 | 3 | 1 |
|---|---|---|---|---|---|
| 0 | 0 | 2 | 4 | 3 | 1 |
| 2 | 2 | 4 | 1 | 0 | 3 |
| 4 | 4 | 1 | 3 | 2 | 0 |
| 3 | 3 | 0 | 2 | 1 | 4 |
| 1 | 1 | 3 | 0 | 4 | 2 |

Addition table-2 over GF(5) for $\alpha = 2$

| + | 0 | 4 | 3 | 1 | 2 |
|---|---|---|---|---|---|
| 0 | 0 | 4 | 3 | 1 | 2 |
| 4 | 4 | 3 | 2 | 0 | 1 |
| 3 | 3 | 2 | 1 | 4 | 0 |
| 1 | 1 | 0 | 4 | 2 | 3 |
| 2 | 2 | 1 | 0 | 3 | 4 |

Addition table-3 over GF(5) for $\alpha = 2$

| + | 0 | 3 | 1 | 2 | 4 |
|---|---|---|---|---|---|
| 0 | 0 | 3 | 1 | 2 | 4 |
| 3 | 3 | 1 | 4 | 0 | 2 |
| 1 | 1 | 4 | 2 | 3 | 0 |
| 2 | 2 | 0 | 3 | 4 | 1 |
| 4 | 4 | 2 | 0 | 1 | 3 |

Addition table-4 over GF(5) for $\alpha = 2$

Each Addition table can be used to construct a distinct set of Structured Codes from the same seed set by uniquely specifying the concatenation order of coset sequences within a subset. Since for primitive root a=2 there are four distinct Addition tables then we can construct four distinct sets of Structured Codes for the seed set specified.

Furthermore, the integer m=5 has two primitive roots, a=2 and a=3. In this case a second distinct Multiplication table over GF(5) based on the powers of a=3 modulo m can be constructed as illustrated below.

| × | | 0<br>0 | $a^0$<br>1 | $a^1$<br>3 | $a^2$<br>4 | $a^3$<br>2 |
|---|---|---|---|---|---|---|
| 0 | 0 | 0 | 0 | 0 | 0 | 0 |
| $a^0$ | 1 | 0 | 1 | 3 | 4 | 2 |
| $a^1$ | 3 | 0 | 3 | 4 | 2 | 1 |
| $a^2$ | 4 | 0 | 4 | 2 | 1 | 3 |
| $a^3$ | 2 | 0 | 2 | 1 | 3 | 4 |

Multiplication table-2 over GF(5) for $\alpha = 3$

As before, each non zero row of the Multiplication table over GF(5) for a=3 can be used to construct four distinct Addition tables which in turn can be used to construct four distinct sets of Structured Codes from the same seed set. Hence, when m=5 it is possible to construct a total of eight distinct sets of Structured Codes from one seed set.

Since the number of available seed sets is large and since the number of available Addition tables is large, then the number and variety of sets of Structured Codes is very large indeed. Therefore, the large code space covered by the Structured Codes make their application to spread spectrum communication systems ideal.

In summary, when m is an odd prime number sets of Structured Codes are constructed by selecting a seed set, constructing cosets, constructing subsets using Addition tables derived from Multiplication tables over GF(m) that specify the unique concatenation order of inner sequences and finally sequentially concatenating subsets to form a full set of Structured Codes.

Condition 2: "m=non-prime integer"

The procedure for constructing a set of Structured Codes when m is non-prime is illustrated by way of example for m=10. Firstly, a seed set $\{a^{(10)}\}$ is selected as illustrated below.

| $\{a^{(10)}\}$ | Seed Set |
|---|---|
| $\{a_n^{(0)}\}$ | +++++++++− |
| $\{a_n^{(1)}\}$ | ++++++++−+ |
| $\{a_n^{(2)}\}$ | +++++++−++ |
| $\{a_n^{(3)}\}$ | ++++++−+++ |
| $\{a_n^{(4)}\}$ | +++++−++++ |
| $\{a_n^{(5)}\}$ | ++++−+++++ |
| $\{a_n^{(6)}\}$ | +++−++++++ |
| $\{a_n^{(7)}\}$ | ++−+++++++ |
| $\{a_n^{(8)}\}$ | +−++++++++ |
| $\{a_n^{(9)}\}$ | −+++++++++ |

In this example, each sequence in the seed set has length w=10. We construct w=10 cosets for $0 \leq i \leq 9$ as illustrated below.

| $Z_m$ | $\{c^{(10)}\}_i$ | $\{c^{(10)}\}_0$ | $\{c^{(10)}\}_1$ | $\{c^{(10)}\}_2$ | $\{c^{(10)}\}_3$ | $\{c^{(10)}\}_4$ |
|---|---|---|---|---|---|---|
| 0 | $\{c_n^{(0)}\}_i$ | +++++++++− | +++++++++− | +++++++++− | +++++++++− | +++++++++− |
| 1 | $\{c_n^{(1)}\}_i$ | ++++++++−+ | ++++++++−+ | ++++++++−+ | ++++++++−+ | ++++++++−+ |
| 2 | $\{c_n^{(2)}\}_i$ | +++++++−++ | +++++++−++ | +++++++−++ | +++++++−++ | +++++++−++ |
| 3 | $\{c_n^{(3)}\}_i$ | ++++++−+++ | ++++++−+++ | ++++++−+++ | ++++++−+++ | ++++++−+++ |
| 4 | $\{c_n^{(4)}\}_i$ | +++++−++++ | +++++−++++ | +++++−++++ | +++++−++++ | +++++−++++ |
| 5 | $\{c_n^{(5)}\}_i$ | ++++−+++++ | ++++−+++++ | ++++−+++++ | ++++−+++++ | −−−−+−−−−− |
| 6 | $\{c_n^{(6)}\}_i$ | +++−++++++ | +++−++++++ | +++−++++++ | −−−+−−−−−− | +++−++++++ |
| 7 | $\{c_n^{(7)}\}_i$ | ++−+++++++ | ++−+++++++ | −−+−−−−−−− | ++−+++++++ | ++−+++++++ |
| 8 | $\{c_n^{(8)}\}_i$ | +−++++++++ | −+−−−−−−−− | +−++++++++ | +−++++++++ | +−++++++++ |
| 9 | $\{c_n^{(9)}\}_i$ | +−−−−−−−−− | −+++++++++ | −+++++++++ | −+++++++++ | −+++++++++ |

-continued

| $Z_m$ | $\{c^{(10)}\}_i$ | $\{c^{(10)}\}_5$ | $\{c^{(10)}\}_6$ | $\{c^{(10)}\}_7$ | $\{c^{(10)}\}_8$ | $\{c^{(10)}\}_9$ |
|---|---|---|---|---|---|---|
| 0 | $\{c_n^{(0)}\}_i$ | ++++++++- | ++++++++- | ++++++++- | ++++++++- | ---------+ |
| 1 | $\{c_n^{(1)}\}_i$ | ++++++++-+ | ++++++++-+ | ++++++++-+ | --------+- | ++++++++-+ |
| 2 | $\{c_n^{(2)}\}_i$ | +++++++-++ | +++++++-++ | -------+-- | +++++++-++ | +++++++-++ |
| 3 | $\{c_n^{(3)}\}_i$ | ++++++-+++ | ------+--- | ++++++-+++ | ++++++-+++ | ++++++-+++ |
| 4 | $\{c_n^{(4)}\}_i$ | -----+---- | +++++-++++ | +++++-++++ | +++++-++++ | +++++-++++ |
| 5 | $\{c_n^{(5)}\}_i$ | ++++-+++++ | ++++-+++++ | ++++-+++++ | ++++-+++++ | ++++-+++++ |
| 6 | $\{c_n^{(6)}\}_i$ | +++-++++++ | +++-++++++ | +++-++++++ | +++-++++++ | +++-++++++ |
| 7 | $\{c_n^{(7)}\}_i$ | ++-+++++++ | ++-+++++++ | ++-+++++++ | ++-+++++++ | ++-+++++++ |
| 8 | $\{c_n^{(8)}\}_i$ | +-++++++++ | +-++++++++ | +-++++++++ | +-++++++++ | +-++++++++ |
| 9 | $\{c_n^{(9)}\}_i$ | -+++++++++ | -+++++++++ | -+++++++++ | -+++++++++ | -+++++++++ |

When m is non-prime, the integer residue class $Z_m = \{0, 1, 2, \ldots m-1\}$ form a finite Ring, R(m), with respect to addition and multiplication modulo m. If a is a primitive root of m then there are $\phi(m)$ residue integers $Z_l$ relatively prime to m, (i.e. $\gcd(l, m)=1$), which can be used to construct an Addition table A(q), where $q=\phi(m)+1$ and $\phi(.)$ is the Euler totient function. When a is a primitive root of m then the powers of a, namely $a^0, a^1, a^2, \ldots a^{\phi(m)-1}$, are all distinct modulo m and correspond to the non-zero residue integers $Z_l$. That is, each residue integer $Z_l$ can be expressed as a power of the primitive root a. Correspondingly, an Addition table over R(m) based on the powers of a modulo m can be constructed. Thus, a=3 is a primitive root of m=10 and the powers of a modulo m are $(a^0, a^1, a^2, a^3)=(1, 3, 9, 7)$. Hence, $q=\phi(10)+1=5$ and the corresponding Addition table A(5) is illustrated below.

| + |   | 0 | $a^0$ | $a^1$ | $a^2$ | $a^3$ |
|---|---|---|---|---|---|---|
|   |   | 0 | 1 | 3 | 9 | 7 |
| 0 | 0 | 0 | 1 | 3 | 9 | 7 |
| $a^0$ | 1 | 1 | 2 | 4 | 0 | 8 |
| $a^1$ | 3 | 3 | 4 | 6 | 2 | 0 |
| $a^2$ | 9 | 9 | 0 | 2 | 8 | 6 |
| $a^3$ | 7 | 7 | 8 | 0 | 6 | 4 |

Addition table-1 over R(10) for $\alpha = 3$

We construct a subset $\{b^{(q)}\}_i$ corresponding to each coset $\{c^{(m)}\}_i$ by concatenating the sequences of $\{c^{(m)}\}_i$ according to the rows of the Addition table A(5) as illustrated below.

| $\{b^{(5)}\}_i$ | i-th Subset for $0 \leq i \leq w - 1$ |
|---|---|
| $\{b_k^{(0)}\}_i$ | $\{c_n^{(0)}\}_i\{c_n^{(1)}\}_i\{c_n^{(3)}\}_i\{c_n^{(9)}\}_i\{c_n^{(7)}\}_i$ |
| $\{b_k^{(1)}\}_i$ | $\{c_n^{(1)}\}_i\{c_n^{(2)}\}_i\{c_n^{(4)}\}_i\{c_n^{(0)}\}_i\{c_n^{(8)}\}_i$ |
| $\{b_k^{(2)}\}_i$ | $\{c_n^{(3)}\}_i\{c_n^{(4)}\}_i\{c_n^{(6)}\}_i\{c_n^{(2)}\}_i\{c_n^{(0)}\}_i$ |
| $\{b_k^{(3)}\}_i$ | $\{c_n^{(9)}\}_i\{c_n^{(0)}\}_i\{c_n^{(2)}\}_i\{c_n^{(8)}\}_i\{c_n^{(6)}\}_i$ |
| $\{b_k^{(4)}\}_i$ | $\{c_n^{(7)}\}_i\{c_n^{(8)}\}_i\{c_n^{(0)}\}_i\{c_n^{(6)}\}_i\{c_n^{(4)}\}_i$ |

Finally, a set of Structured Codes $\{s^{(N)}\}$, which contains N outer sequences, $\{s_k^{(\cdot)}\}$, each of length N, where $N = q \times w = 50$, is constructed by sequentially concatenating the subsets $\{b^{(5)}\}_i$ for i=0, 1, 2, 3, 4, 5, 6, 7, 8 and 9 as illustrated below.

| $\{S^{(50)}\}$ | Set of Structured Codes |
|---|---|
| $\{S_k^{(0)}\}$ | ++++++++-+++++++-+++++++-++++---------++-+++++++ |
| $\{S_k^{(1)}\}$ | ++++++++-+++++++-+++++++-+++++++++++++-+-+++++++ |
| $\{S_k^{(2)}\}$ | ++++++-+++++++-+++++++-+++++++++++++++-+++++++- |
| $\{S_k^{(3)}\}$ | +--------+++++++-+++++++-+++-+++++++++++-+++++ |
| $\{S_k^{(4)}\}$ | ++-+++++++-+++++++-+++++++-+++-+++++++++++-++++ |
| $\{S_k^{(5)}\}$ | ++++++++-+++++++-+++++++-+++-+++++++++++-++++++ |
| $\{S_k^{(6)}\}$ | ++++++++-+++++++-+++++++-+++++++++++--+-------- |
| $\{S_k^{(7)}\}$ | ++++++-+++++++-+++++++-+++++++++++++++-+++++++- |
| $\{S_k^{(8)}\}$ | -+++++++++++++++-+++++++-++-+--------++-+++++++ |
| $\{S_k^{(9)}\}$ | ++-+++++++-+--------+++++++-+++++++++++-++++++ |
| $\{S_k^{(10)}\}$ | ++++++++-+++++++-+++++++-+++-+++++++++-+------- |
| $\{S_k^{(11)}\}$ | ++++++++-+++++++-+++++++-+++++++++++++-+-+++++++ |
| $\{S_k^{(12)}\}$ | ++++++-+++++++-+++++++-+++++++++++++++-+++++++- |
| $\{S_k^{(13)}\}$ | -+++++++++++++++-+++++++-+++-+++++++++++-+++++ |
| $\{S_k^{(14)}\}$ | --+--------+-+++++++-+++++++-+++-+++++++++++-++++ |
| $\{S_k^{(15)}\}$ | ++++++++-+++++++-+++++++-+++-+++++++++++-++++++ |
| $\{S_k^{(16)}\}$ | ++++++++-+++++++-+++++++-+++++++++++++-+-+++++++ |
| $\{S_k^{(17)}\}$ | ++++++-+++++++-++++---+-------+++++++-+++++++++- |
| $\{S_k^{(18)}\}$ | -+++++++++++++++-+++++++-+++-+++++++++---+------ |
| $\{S_k^{(19)}\}$ | ++-+++++++-+++++++-+++++++-----+-------++++-++++ |
| $\{S_k^{(20)}\}$ | ++++++++-+++++++-+++++++-+++-+++++++++++-++++++ |
| $\{S_k^{(21)}\}$ | ++++++++-+++++++-+++++++-+++++++++++++-+-+++++++ |
| $\{S_k^{(22)}\}$ | ++++++-+++++++-+++++++-+++++++++++++++-+++++++- |
| $\{S_k^{(23)}\}$ | -+++++++++++++++-+++++++-+++-+++++++++++-+++++ |
| $\{S_k^{(24)}\}$ | ++-+++++++-+++++++-+++++++-+++-+++++++++++-++++ |

-continued

| | |
|---|---|
| {S$^{(50)}$} | Set of Structured Codes |
| {S$_k^{(25)}$} | +++++++++-++++++++-+++++++-+++-++++++++++++-+++++++ |
| {S$_k^{(26)}$} | +++++++++-++++++++-++------+----++++++++++-+-++++++++ |
| {S$_k^{(27)}$} | ++++++-+++-----+----+++-+++++++++++++-++++++++++++- |
| {S$_k^{(28)}$} | -++++++++++++++++++-+++++++-+++-++++++++++++-+++++++ |
| {S$_k^{(29)}$} | ++-+++++++++-++++++++++++++++-+++-++++++-----+---- |
| {S$_k^{(30)}$} | +++++++++-++++++++-+------+----+++++++++++-+++++++ |
| {S$_k^{(31)}$} | +++++++++-++++++++-+++++++-++++++++++++-+-++++++++ |
| {S$_k^{(32)}$} | ------+---+++++-+++++++-+++++++++++++-++++++++++++- |
| {S$_k^{(33)}$} | -++++++++++++++++++-+++++++-+++-++++++++++++-+++++++ |
| {S$_k^{(34)}$} | ++-+++++++++-++++++++++++++++-+++-++++++++++++-++++ |
| {S$_k^{(35)}$} | +++++++++-++++++++-+++++++-+++-++++++++++++-+++++++ |
| {S$_k^{(36)}$} | +++++++++-+--------+--+++++-++++++++++++-+-++++++++ |
| {S$_k^{(37)}$} | ++++++-++++++++-+++++++-++++++-------+-++++++++++- |
| {S$_k^{(38)}$} | -++++++++++++++++++-+++++++--------+--+-++++++++++++-+++++++ |
| {S$_k^{(39)}$} | ++-+++++++++-++++++++++++++++-+++-++++++++++++-++++ |
| {S$_k^{(40)}$} | +++++++++---------+-+++++++-+++-++++++++++++-+++++++ |
| {S$_k^{(41)}$} | --------+-++++++++-+++++++-++++++++++++-+-++++++++ |
| {S$_k^{(42)}$} | ++++++-++++++++-+++++++-++++++++++++++++-++++++++++- |
| {S$_k^{(43)}$} | -++++++++++++++++++-+++++++-+++-++++++++++++-+++++++ |
| {S$_k^{(44)}$} | ++-+++++++++-++++++++++++++++-+++-++++++++++++-++++ |
| {S$_k^{(45)}$} | ----------+++++++++-+++++++-+++-++++++++++++-+++++++ |
| {S$_k^{(46)}$} | +++++++++-++++++++-+++++++-++++---------++-++++++++ |
| {S$_k^{(47)}$} | ++++++-++++++++-+++++++-+++++++++++++-++---------+ |
| {S$_k^{(48)}$} | -++++++++--------+++++++-+++-++++++++++++-+++++++ |
| {S$_k^{(49)}$} | ++-+++++++++-++++++++---------++++-++++++++++++-++++ |

For the primitive root a=3 we can construct another three distinct Addition tables over R(10). Firstly, the Multiplication table over R(10) based on the powers of a modulo m is constructed. Secondly, each non-zero row of the Multiplication table is used to construct a distinct Addition table. The first non-zero row of the Multiplication table constructs Addition table-1 over R(10) used above while the following three non-zero rows construct another three distinct Addition tables over R(10) as illustrated below.

| × | | 0 | $a^0$ | $a^1$ | $a^2$ | $a^3$ |
|---|---|---|---|---|---|---|
|   |   | 0 | 1 | 3 | 9 | 7 |
| 0 | 0 | 0 | 0 | 0 | 0 | 0 |
| $a^0$ | 1 | 0 | 1 | 3 | 9 | 7 |
| $a^1$ | 3 | 0 | 3 | 9 | 7 | 1 |
| $a^2$ | 9 | 0 | 9 | 7 | 1 | 3 |
| $a^3$ | 7 | 0 | 7 | 1 | 3 | 9 |

Multiplication table-1 over R(10) for α = 3

| + | 0 | 3 | 9 | 7 | 1 |
|---|---|---|---|---|---|
| 0 | 0 | 3 | 9 | 7 | 1 |
| 3 | 3 | 6 | 2 | 0 | 4 |
| 9 | 9 | 2 | 8 | 6 | 0 |
| 7 | 7 | 0 | 6 | 4 | 8 |
| 1 | 1 | 4 | 0 | 8 | 2 |

Addition table-2 over R(10) for α = 3

| + | 0 | 9 | 7 | 1 | 3 |
|---|---|---|---|---|---|
| 0 | 0 | 9 | 7 | 1 | 3 |
| 9 | 9 | 8 | 6 | 0 | 2 |
| 7 | 7 | 6 | 4 | 8 | 0 |
| 1 | 1 | 0 | 8 | 2 | 4 |
| 3 | 3 | 2 | 0 | 4 | 6 |

Addition table-3 over R(10) for α = 3

| + | 0 | 7 | 1 | 3 | 9 |
|---|---|---|---|---|---|
| 0 | 0 | 7 | 1 | 3 | 9 |
| 7 | 7 | 4 | 8 | 0 | 6 |
| 1 | 1 | 8 | 2 | 4 | 0 |
| 3 | 3 | 0 | 4 | 6 | 2 |
| 9 | 9 | 6 | 0 | 2 | 8 |

Addition table-4 over R(10) for α = 3

Each Addition table can be used to construct a set of Structured Codes from the same seed set by uniquely specifying the concatenation order of coset sequences within a subset. Since for primitive root a=3 there are four distinct Addition tables then we can construct four sets of Structured Codes for the seed set specified.

Furthermore, the non-prime integer m=10 has two primitive roots, a=3 and a=7. In this case a second distinct Multiplication table over R(10) based on the powers of a=7 modulo m can be constructed as illustrated below.

| × | | 0 | $a^0$ | $a^1$ | $a^2$ | $a^3$ |
|---|---|---|---|---|---|---|
|   |   | 0 | 1 | 7 | 9 | 3 |
| 0 | 0 | 0 | 0 | 0 | 0 | 0 |
| $a^0$ | 1 | 0 | 1 | 7 | 9 | 3 |
| $a^1$ | 7 | 0 | 7 | 9 | 3 | 1 |
| $a^2$ | 9 | 0 | 9 | 3 | 1 | 7 |
| $a^3$ | 3 | 0 | 3 | 1 | 7 | 9 |

Multiplication table-2 over R(10) for α = 7

As before, each non zero row of the Multiplication table over R(10) for a=7 can be used to construct four distinct Addition tables which in turn can be used to construct four sets of Structured Codes from the same seed set. Hence, when m=10 it is possible to construct a total of eight sets of Structured Codes from one seed set.

In general, when m is non-prime, the sets of Structured Codes constructed have inferior properties compared to those constructed when m is an odd prime integer.

In summary, when m is a non-prime number sets of Structured Codes are constructed by selecting a seed set, constructing cosets, constructing subsets using Addition tables derived from Multiplication tables over R(m) that specify the unique concatenation order of inner sequences and finally sequentially concatenating subsets to form a full set of Structured Codes.

Condition 3: "$m=p^s$ when p is prime"

A Galois field can be constructed for any prime number p or any integer power of a prime number $p^s$. The Galois field $GF(p^s)$ having $p^s$ elements is called an extension field of the Galois field GF(p) having p elements. The elements of GF(p) are the integer residue class $Z_p=\{0, 1, 2, \ldots p-1\}$ with field addition and multiplication being carried out modulo p. The elements of $GF(p^s)$ are polynomials of degree $\leq s-1$ over GF(p), i.e. the coefficients of the polynomials are elements in GF(p). Then field addition and multiplication are carried out modulo g(x) where g(x) is a primitive polynomial of degree s over GF(p). A polynomial of degree s is said to be primitive if the smallest integer r for which g(x) divides $x^r+1$ is $p^s-1$. Primitive polynomials are irreducible because they can not be factorised (i.e. they are not the product of any two polynomials of lower degree).

The procedure for constructing a set of Structured Codes is illustrated by way of example when $m=2^2$, that is, p=2 and s=2. Firstly, a seed set $\{a^{(4)}\}$ is selected as illustrated below.

| $\{a^{(4)}\}$ | Seed Set |
|---|---|
| $\{a_n^{(0)}\}$ | +++− |
| $\{a_n^{(1)}\}$ | ++−+ |
| $\{a_n^{(2)}\}$ | +−++ |
| $\{a_n^{(3)}\}$ | −+++ |

In this example, each sequence in the seed set has length w=4. We construct w=4 cosets using the procedure described above for i=0, 1, 2, and 3 as illustrated below.

| $Z_m$ | $Z_p[x]$ | $\{c^{(4)}\}_i$ | $\{c^{(4)}\}_0$ | $\{c^{(4)}\}_1$ | $\{c^{(4)}\}_2$ | $\{c^{(4)}\}_3$ |
|---|---|---|---|---|---|---|
| 0 | 0 | $\{c_n^{(0)}\}_i$ | +++− | +++− | +++− | −−−+ |
| 1 | 1 | $\{c_n^{(1)}\}_i$ | ++−+ | ++−+ | −−+− | ++−+ |
| 2 | x | $\{c_n^{(2)}\}_i$ | +−++ | −+−− | +−++ | +−++ |
| 3 | x+1 | $\{c_n^{(3)}\}_i$ | +−−− | −+++ | −+++ | −+++ |

Let $Z_p[x]$ denote the residue classes of polynomials modulo g(x) in the variable x. Then $Z_p[x]$ is the set of polynomials modulo g(x) each with degree less than the degree of g(x). When g(x) is a primitive polynomial of degree s over GF(p), then $Z_p[x]$ forms a Galois polynomial field $GF(p^s)$ with respect to addition and multiplication modulo g(x). The Galois field $GF(p^s)$ contains $p^s$ elements corresponding to the residue classes of polynomials g(x). If a is a primitive element of $GF(p^s)$, where there are exactly $\phi(p^s-1)$ primitive elements, then the powers of a, namely $a^0$, $a^1$, $a^2$, ... $a^{m-2}$, are all distinct modulo g(x) and correspond to the non-zero residue polynomials in $Z_p[x]$. That is, each residue polynomial can be expressed as a power of the primitive element a. Correspondingly, an Addition table over $GF(p^s)$ based on the powers of a modulo g(x) can be constructed. Thus, a=x is a primitive element of the primitive polynomial $g(x)=x^2+x+1$ and the powers of a modulo g(x) are $(a^0, a^1, a^2)=(1, x, x+1)$. Hence, $q=p^s=2^2$ and the corresponding Addition table $A(2^2)$ is illustrated below.

| + | | 0 | $a^0$ | $a^1$ | $a^2$ |
|---|---|---|---|---|---|
| | | 0 | 1 | x | x+1 |
| 0 | 0 | 0 | 1 | x | x+1 |
| $a^0$ | 1 | 1 | 0 | x+1 | x |
| $a^1$ | x | x | x+1 | 0 | 1 |
| $a^2$ | x+1 | x+1 | x | 1 | 0 |

Addition table-1 over $GF(2^2)$ for $\alpha = x$ and $g(x) = x^2 + x + 1$

We construct a subset $\{b^{(4)}\}_i$ corresponding to each coset $\{c^{(m)}\}_i$ by concatenating the sequences of $\{c^{(m)}\}_i$ according to the rows of the Addition table $A(2^2)$. This procedure is facilitated by assigning the integer residue class $Z_{m=4}=\{0, 1, 2, 3\}$ to the polynomial residue class $Z_{p=2}[x]=\{0, 1, x, x+1\}$ according to the sequential mapping $0 \rightarrow 0$, $1 \rightarrow 1$, $x \rightarrow 2$ and $x+1 \rightarrow 3$. Then the i-th subset $\{b^{(4)}\}_i$ is illustrated below.

| $\{b^{(4)}\}_i$ | i-th Subset for $0 \leq i \leq w - 1$ |
|---|---|
| $\{b_k^{(0)}\}_I$ | $\{c_n^{(0)}\}_i\{c_n^{(1)}\}_i\{c_n^{(2)}\}_i\{c_n^{(3)}\}_i$ |
| $\{b_k^{(1)}\}_I$ | $\{c_n^{(1)}\}_i\{c_n^{(0)}\}_i\{c_n^{(3)}\}_i\{c_n^{(2)}\}_i$ |
| $\{b_k^{(2)}\}_I$ | $\{c_n^{(2)}\}_i\{c_n^{(3)}\}_i\{c_n^{(0)}\}_i\{c_n^{(1)}\}_i$ |
| $\{b_k^{(3)}\}_I$ | $\{c_n^{(3)}\}_i\{c_n^{(2)}\}_i\{c_n^{(1)}\}_i\{c_n^{(0)}\}_i$ |

The subsets $\{b^{(4)}\}_i$ for i=0, 1, 2, and 4 are illustrated below.

| $\{b^{(4)}\}_0$ | Subset 0 |
|---|---|
| $\{b_k^{(0)}\}_0$ | +++−++−++−+++−−− |
| $\{b_k^{(1)}\}_0$ | ++−+++++−−−−+−++ |
| $\{b_k^{(2)}\}_0$ | +−+++−−−+++−++−+ |
| $\{b_k^{(3)}\}_0$ | +−−−+−+++−++++++ |
| $\{b^{(4)}\}_1$ | Subset 1 |
| $\{b_k^{(0)}\}_1$ | +++−++−+−+−−−+++ |
| $\{b_k^{(1)}\}_1$ | ++−+++++−−+++−+−− |
| $\{b_k^{(2)}\}_1$ | −+−−−+++++++−−+−+ |
| $\{b_k^{(3)}\}_1$ | −+++−+−−++−++++− |
| $\{b^{(4)}\}_2$ | Subset 2 |
| $\{b_k^{(0)}\}_2$ | +++−−−−+−+−++−+++ |
| $\{b_k^{(1)}\}_2$ | −−+−+++−++++−+−− |
| $\{b_k^{(2)}\}_2$ | +−++++++++++−−−+− |
| $\{b_k^{(3)}\}_2$ | −++++−−++−+−+++− |
| $\{b^{(4)}\}_3$ | Subset 3 |
| $\{b_k^{(0)}\}_3$ | −−−+++−++−++−+++ |
| $\{b_k^{(1)}\}_3$ | ++−+−−−+−++++−++ |
| $\{b_k^{(2)}\}_3$ | +−++−+++−−−+++−+ |
| $\{b_k^{(3)}\}_3$ | −++++−+++−+−+−−−− |

Finally, a set of Structured Codes $\{s^{(N)}\}$, which contains N outer sequences, $\{s_k^{(\cdot)}\}$, each of length N where $N=q \times w=16$, is constructed by sequentially concatenating the subsets $\{b^{(4)}\}_i$ for i=0, 1, 2, and 3 as illustrated below.

| $\{s^{(16)}\}$ | Structured Codes |
|---|---|
| $\{S_k^{(0)}\}$ | +++−++−++−+++−−− |
| $\{S_k^{(1)}\}$ | ++−+++++−−−−+−++ |
| $\{S_k^{(2)}\}$ | +−+++−−−+++−++−+ |

-continued

| {s^(16)} | Structured Codes |
|---|---|
| {S_k^(3)}  | +---+-++++-++++- |
| {S_k^(4)}  | +++-++-+-+---+++ |
| {S_k^(5)}  | ++-++++--+++-+-- |
| {S_k^(6)}  | -+---++++++-++-+ |
| {S_k^(7)}  | -+++-+--++-++++- |
| {S_k^(8)}  | +++---+-+-++-+++ |
| {S_k^(9)}  | --+-+++--++++-++ |
| {S_k^(10)} | +-++-++++++---+- |
| {S_k^(11)} | -++++-++--+-+++- |
| {S_k^(12)} | ---+++-++-++-+++ |
| {S_k^(13)} | ++-+----+-++++-++ |
| {S_k^(14)} | +-++-+++---+++-+ |
| {S_k^(15)} | -++++-++++-+---+ |

For the primitive element a=x we can construct another two distinct Addition tables over $GF(2^2)$. Firstly, the Multiplication table over $GF(2^2)$ based on the powers of a modulo g(x) is constructed. Secondly, each non-zero row of the Multiplication table is used to construct a distinct Addition table. The first non-zero row of the Multiplication table constructs Addition table-1 over $GF(2^2)$ used above while the following two non-zero rows construct another two distinct Addition tables as illustrated below.

| × | 0 | $\alpha^0$ | $\alpha^1$ | $\alpha^2$ |
|---|---|---|---|---|
|   | 0 | 1 | x | x + 1 |
| 0 | 0 | 0 | 0 | 0 |
| $\alpha^0$ | 0 | 1 | x | x + 1 |
| $\alpha^1$ | 0 | x | x + 1 | 1 |
| $\alpha^2$ | 0 | x + 1 | 1 | x |

Multiplication table-1 over $GF(2^2)$ for $\alpha$ = x and g(x) = $x^2$ + x + 1

| + | 0 | x | x + 1 | 1 |
|---|---|---|---|---|
| 0 | 0 | x | x + 1 | 1 |
| x | x | 0 | 1 | x + 1 |
| x + 1 | x + 1 | 1 | 0 | x |
| 1 | 1 | x + 1 | x | 0 |

Addition table-2 over $GF(2^2)$ for $\alpha$ = x and g(x) = $x^2$ + x + 1

| + | 0 | x + 1 | 1 | x |
|---|---|---|---|---|
| 0 | 0 | x + 1 | 1 | x |
| x + 1 | x + 1 | 0 | x | 1 |
| 1 | 1 | x | 0 | x + 1 |
| x | x | 1 | x + 1 | 0 |

Addition table-3 over $GF(2^2)$ for $\alpha$ = x and g(x) = $x^2$ + x + 1

Each Addition table can be used to construct a distinct set of Structured Codes from the same seed set by uniquely specifying the concatenation order of coset sequences within a subset. Since for primitive root a=x there are three distinct Addition tables then we can construct three distinct sets of Structured Codes for the seed set specified.

Furthermore, the primitive polynomial $g(x)=x^2+x+1$ has exactly $\phi(p^s-1)=\phi(2^2-1)=2$ primitive elements, a=x and a=x+1. In this case a second distinct Multiplication table over $GF(2^2)$ based on the powers of a=x+1 modulo g(x) can be constructed as illustrated below.

| × | 0 | $\alpha^0$ | $\alpha^1$ | $\alpha^2$ |
|---|---|---|---|---|
|   | 0 | 1 | x + 1 | x |
| 0 | 0 | 0 | 0 | 0 |
| $\alpha^0$ | 1 | 0 | 1 | x + 1 | x |
| $\alpha^1$ | x + 1 | 0 | x + 1 | x | 1 |
| $\alpha^2$ | x | 0 | x | 1 | x + 1 |

Multiplication table-2 over $GF(2^2)$ for $\alpha$ = x + 1 and g(x) = $x^2$ + x + 1

As before, each non zero row of the Multiplication table over $GF(2^2)$ for a=x+1 can be used to construct three distinct Addition tables which in turn can be used to construct three distinct sets of Structured Codes from the same seed set.

Since there are exactly $\phi(p^s-1)/s$ distinct primitive polynomials of degree s in $GF(p^s)$, then there is only one primitive polynomial $g(x)=x^2+x+1$ when $m=2^2$. Hence, when $m=2^2$ it is possible to construct a total of six distinct sets of Structured Codes from one seed set.

In summary, when $m=p^s$ where p is a prime number then sets of Structured Codes are constructed by selecting a seed set, constructing cosets, constructing subsets using Addition tables derived from Multiplication tables over $GF(p^s)$ that specify the unique concatenation order of inner sequences and finally sequentially concatenating subsets to form a full set of Structured Codes.

Alternative Constructs

When m, the number of sequences within a seed set, can not be characterised by one of the three conditions described above then an alternative construct can be used. In fact, this alternative construct may be used for any value of the integer m. However, the alternative construct is particularly useful when the integer m is non-prime and has no primitive roots. In this case, the $\phi(m)$ residue integers $Z_l$ relatively prime to m can not be generated from the powers of a primitive root because in this case the number m does not have any primitive roots. For the alternative construct, the integer residue class $Z_m=\{0, 1, 2, \ldots m-1\}$ which form a finite ring R(m) is used directly to construct an Addition table modulo m over R(m). For example, when m=15 the corresponding Addition table A(15) is illustrated below.

| + | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 |
| 1 | 1 | 2 | 3 | 4 | 5 | 6 | 7 | 8 | 9 | 10 | 11 | 12 | 13 | 14 | 0 |
| 2 | 2 | 3 | 4 | 5 | 6 | 7 | 8 | 9 | 10 | 11 | 12 | 13 | 14 | 0 | 1 |
| 3 | 3 | 4 | 5 | 6 | 7 | 8 | 9 | 10 | 11 | 12 | 13 | 14 | 0 | 1 | 2 |
| 4 | 4 | 5 | 6 | 7 | 8 | 9 | 10 | 11 | 12 | 13 | 14 | 0 | 1 | 2 | 3 |
| 5 | 5 | 6 | 7 | 8 | 9 | 10 | 11 | 12 | 13 | 14 | 0 | 1 | 2 | 3 | 4 |
| 6 | 6 | 7 | 8 | 9 | 10 | 11 | 12 | 13 | 14 | 0 | 1 | 2 | 3 | 4 | 5 |
| 7 | 7 | 8 | 9 | 10 | 11 | 12 | 13 | 14 | 0 | 1 | 2 | 3 | 4 | 5 | 6 |
| 8 | 8 | 9 | 10 | 11 | 12 | 13 | 14 | 0 | 1 | 2 | 3 | 4 | 5 | 6 | 7 |
| 9 | 9 | 10 | 11 | 12 | 13 | 14 | 0 | 1 | 2 | 3 | 4 | 5 | 6 | 7 | 8 |
| 10 | 10 | 11 | 12 | 13 | 14 | 0 | 1 | 2 | 3 | 4 | 5 | 6 | 7 | 8 | 9 |

-continued

| + | 0 | 1 | 2 | 3 | 4 | 5 | 6 | 7 | 8 | 9 | 10 | 11 | 12 | 13 | 14 |
|---|---|---|---|---|---|---|---|---|---|---|----|----|----|----|----|
| 11 | 11 | 12 | 13 | 14 | 0 | 1 | 2 | 3 | 4 | 55 | 6 | 7 | 8 | 9 | 10 |
| 12 | 12 | 13 | 14 | 0 | 1 | 2 | 3 | 4 | 5 | 6 | 7 | 8 | 9 | 10 | 11 |
| 13 | 13 | 14 | 0 | 1 | 2 | 3 | 4 | 5 | 6 | 7 | 8 | 9 | 10 | 11 | 12 |
| 14 | 14 | 0 | 1 | 2 | 3 | 4 | 5 | 6 | 7 | 8 | 9 | 10 | 11 | 12 | 13 |

Addition table over R(15) using $Z_{15}$

The i-th subset of sequences, denoted by $\{b^{(q)}\}_i$, is then constructed in the usual way by concatenating the sequences of the i-th coset, $\{c^{(m)}\}_i$, according to the predefined Addition table where q=m in this case. A set of Structured Codes, denoted by $\{s^{(N)}\}$, is constructed by sequentially concatenating the w subsets $\{b^{(q)}\}_i$ for $0 \leq i \leq w-1$. The set of Structured Codes will contains N sequences each of length $N=q \times w$. For this construction rule only one Addition table can be constructed and therefore only one corresponding set of Structured Codes can be constructed.

A further refinement to the alternative construction rule is possible when m is non-prime and without primitive roots. Instead of using the integer residue class $Z_m=\{0, 1, 2, \ldots m-1\}$ to construct an Addition table we can use the $\phi(m)$ residue integers $Z_I$ relatively prime to m to construct an Addition table. For example, when m=15, the $\phi(15)=8$ residue integers relatively prime to 15 are $\{2, 4, 7, 8, 11, 13, 14\}$ and the corresponding Addition table is illustrated below.

| + | 0 | 1 | 2 | 4 | 7 | 8 | 11 | 13 | 14 |
|---|---|---|---|---|---|---|----|----|----|
| 0 | 0 | 1 | 2 | 4 | 7 | 8 | 11 | 13 | 14 |
| 1 | 1 | 2 | 3 | 5 | 8 | 9 | 12 | 14 | 0 |
| 2 | 2 | 3 | 4 | 6 | 9 | 10 | 13 | 0 | 1 |
| 4 | 4 | 5 | 6 | 8 | 11 | 12 | 0 | 2 | 3 |
| 7 | 7 | 8 | 9 | 11 | 14 | 0 | 3 | 5 | 6 |
| 8 | 8 | 9 | 10 | 12 | 0 | 1 | 4 | 6 | 7 |
| 11 | 11 | 12 | 13 | 0 | 3 | 4 | 7 | 9 | 10 |
| 13 | 13 | 14 | 0 | 2 | 5 | 6 | 9 | 11 | 12 |
| 14 | 14 | 0 | 1 | 3 | 6 | 7 | 10 | 12 | 13 |

Addition table-1 over R(15) using $Z_1$ when m = 15

Again, the i-the subset of sequences, denoted by $\{b^{(q)}\}$, is then constructed in the usual way by concatenating the sequences of the i-th coset, $\{c^{(m)}\}_i$, according to the predefined Addition table, where $q=\phi(15)+1=9$ in this case. A set of Structured Codes, denoted by $\{s^{(N)}\}$, is constructed by sequentially concatenating the w subsets $\{b^{(q)}\}_i$ for $0 \leq i \leq w-1$. The set of Structured Codes will contains N sequences each of length $N=q \times w$.

Although m=15 has no primitive roots, we can construct another seven distinct Addition tables over R(15). Firstly, the Multiplication table over R(15) based on the $\phi(15)=8$ residue integers relatively prime to 15 is constructed as illustrated below.

| x | 0 | 1 | 2 | 4 | 7 | 8 | 11 | 13 | 14 |
|---|---|---|---|---|---|---|----|----|----|
| 0 | 0 | 0 | 0 | 0 | 0 | 0 | 0 | 0 | 0 |
| 1 | 0 | 1 | 2 | 4 | 7 | 8 | 11 | 13 | 14 |
| 2 | 0 | 2 | 4 | 8 | 14 | 1 | 7 | 11 | 13 |
| 4 | 0 | 4 | 8 | 1 | 13 | 2 | 14 | 7 | 11 |
| 7 | 0 | 7 | 14 | 13 | 4 | 11 | 2 | 1 | 8 |
| 8 | 0 | 8 | 1 | 2 | 11 | 4 | 13 | 14 | 7 |
| 11 | 0 | 11 | 7 | 14 | 2 | 13 | 1 | 8 | 4 |
| 13 | 0 | 13 | 11 | 7 | 1 | 14 | 8 | 4 | 2 |
| 14 | 0 | 14 | 13 | 11 | 8 | 7 | 4 | 2 | 1 |

Multiplication table over R(15) using $Z_1$ when m = 15

Secondly, each non-zero row of the Multiplication table is used to construct a distinct Addition table. The first non-zero row of the Multiplication table constructs Addition table-1 over R(15) using $Z_I$ when m=15 was illustrated above while the following seven non-zero rows construct another seven distinct Addition tables over R(1 5) using $Z_I$ when m=15.

Each Addition table can be used to construct a set of Structured Codes from the same seed set by uniquely specifying the concatenation order of coset sequences within a subset. Since for m=15 there are eight distinct Addition tables over R(15) using $Z_I$ when m=15 then we can construct eight sets of Structured Codes for a specified seed set. However, because there are no primitive roots then only one Multiplication table can be constructed in this case.

In a similar manner, a refinement to the alternative construction rule is possible when $m=p^s$. For any irreducible polynomial g(x) of degree s over GF(p) the residue classes $Z_p[x]$ form a Galois polynomial field over GF(p) with respect to addition and multiplication modulo g(x). The Galois polynomial field over GF(p) contains exactly $p^s$ polynomial elements each of degree $\leq s-1$ and each belonging to the residue classes of polynomials $Z_p[x]$ modulo g(x).

For this refinement, the only requirement is that the polynomial g(x) be irreducible. Then the residue classes $Z_p[x]$ can be used directly to construct a distinct Multiplication table over $GF(p^s)$. However, only one multiplication table can be constructed for this case. Subsequently, each non-zero row of the Multiplication table can be used to construct a distinct Addition table, which in turn defines the concatenation order of coset sequences that make up a subset. A further refinement in this case is also possible. When g(x) is a primitive polynomial then the construct described in Condition 3 is used since for any primitive element a of $GF(p^s)$ the powers of a, namely $a^0, a^1, a^2, \ldots a^{m-2}$, are all distinct modulo g(x) and correspond to the non-zero residue polynomials in $Z_p[x]$. That is, each residue polynomial can be expressed as a power of the primitive element a and the order $\epsilon$ of the primitive element a is equal to $p^s-1$ such that $a^\epsilon=1$. Correspondingly, Multiplication and an Addition tables over $GF(p^s)$ based on all the powers of a modulo g(x) can be constructed. However, if the polynomial g(x) is irreducible but not primitive then for any element a of $GF(p^s)$ the powers of a, namely $a^0, a^1, a^2, \ldots a^{m-2}$, are not all distinct modulo g(x). Instead, if the order of element a is $\epsilon$, where $\epsilon<p^s-1$ but $\epsilon|p^s-1$ is the least positive integer for which $a^\epsilon=1$, then the powers of a up to $\epsilon-1$, namely $a^0$, $a^1, a^2, \ldots a^{\epsilon-1}$, are distinct modulo g(x). In this case it is possible to construct Multiplication and Addition tables over $GF(p^s)$ based on the powers of a up to $\epsilon-1$, i.e. $a^0, a^1, a^2, \ldots a^{\epsilon-1}$, modulo g(x). If this further refinement is used then it is preferable to chose an element a with the largest possible value of $\epsilon$ where there are exactly $\phi(\epsilon)$ elements of order $\epsilon$ and hence it is possible to construct $\phi(\epsilon)$ Multiplication tables corresponding to the order $\epsilon$. Once Addition tables are defined then the construction of Structured Codes can proceed as normal.

In summary, these refinements are included in order to complete the construction theory of Structured Codes. In practice, the most useful constructs are provided by Conditions 1, 3 and the Alternative Construct using the integer residue class $Z_m$. The constructs provided by Condition 2 and the refinements described above, when m is non-prime without primitive roots or when g(x) is irreducible but not primitive, are less useful in practice but nonetheless complete.

The algorithms illustrated above provide a systematic way of constructing a very large number of sets of Structured Codes. In this section algorithms are illustrated that provide guidelines for selecting seed sets that generate particularly useful Structured Codes for application in communication systems. Specifically, three families of Structured Codes are identified called Cyclical, Orthogonal and Balanced Structured Codes, respectively. The properties of a set of Structured Codes are underpinned by the seed set from which they are constructed. In general, a seed set can be selected from any family of sequences including binary or non-binary, real or complex, quadriphase or polyphase etc. with corresponding mathematical operations being performed accordingly. For example, in the case of binary sequences there are $2^w!/m!(2^w-m)!$ possible distinct seed sets consisting of m sequences each of length w. Hence, even for modest values of m and w the number of seed sets available is very large indeed. For example, when m=4 and w=4 there are 1820 available binary seed sets.

In the case of binary sequences, a seed set could be constructed from any set of random binary sequences. However, the first and most obvious way to select a seed set is to choose it from a set of known sequences that have known good correlation properties. For example, we can select the seed set from a set of m-sequences or Gold sequences or Gold-like sequences or small sets of Kasami sequences or large sets of Kasami sequences or Barker sequences or Legendre sequences or GMW sequences or Golay sequences or Frank sequences or Chu sequences or Huffman sequences etc. etc. However, sets of Structured Codes with good correlation properties are obtained when the number m of sequences in the seed set is equal to the length w of a seed sequence, that is, m=w. More specifically, if the binary sequence $\{a_n\}=(a_0, a_1, a_2, \ldots a_{w-1})$ of length w is cyclically distinct, quasi-balanced and satisfies the optimal periodic autocorrelation condition $$R(\tau) = \begin{cases} w & \text{for } \tau = 0 \\ \pm 1 & \text{for } \tau \neq 0 \end{cases}$$

then a seed set $\{a^w\}$ constructed from the w left or right cyclical shifts of $\{a_n\}$ produces sets of Cyclical Structured Codes with good correlation properties. The term quasi-balanced is taken to mean that the number of "+" and "−" elements in $\{a_n\}$ differ by one. The name Cyclical Structured Codes refers to the cyclical method used to construct the seed set. Examples of sequences that are quasi-balanced and fulfill the optimal periodic autocorrelation condition include all m-sequences, the binary Barker sequences (++−), (+++−+−) and (+++−−−+−−+−), Legendre sequences when $w=4^{k-1}$ for integer k and certain GMW sequences. Other binary sequences that fulfill these conditions do exist. The procedure for constructing a seed set for generating a set of Cyclical Structured Codes is illustrated by way of example below when m=w=7 and $\{a_n\}=(+++−+−−)$, i.e. an m-sequence.

| $\{a^{(7)}\}$ | Seed Set |
|---|---|
| $\{a_n^{(0)}\}$ | +++−+−− |
| $\{a_n^{(1)}\}$ | ++−+−−+ |
| $\{a_n^{(2)}\}$ | +−+−−++ |
| $\{a_n^{(3)}\}$ | −+−−+++ |
| $\{a_n^{(4)}\}$ | +−−+++− |
| $\{a_n^{(5)}\}$ | −−+++−+ |
| $\{a_n^{(6)}\}$ | −+++−+− |

One of the most significant constructs used in the generation of Structured Codes occurs when the seed set is orthogonal and m=w. The term orthogonal is taken to mean that every sequence in the seed set is orthogonal to every other sequence in the seed set. When the seed set is orthogonal and m=w then the resulting set of Structured Codes is also orthogonal. Sets of Structured Codes that are orthogonal have been called Orthogonal Structured Codes. Hence, the identification of orthogonal seed sets is specifically relevant to the generation of Orthogonal Structured Codes. It is almost certain that there is only one periodic sequence that satisfies the ideal periodic autocorrelation condition shown below:

$$R(\tau) = \begin{cases} w & \text{for } \tau = 0 \\ 0 & \text{for } \tau \neq 0 \end{cases}$$

and this sequence is $\{a_n\}=(+++−)$. Then an orthogonal seed set $\{a^{(4)}\}$ can be constructed from the four left or right cyclical shifts of $\{a_n\}$ and the resulting set of Structured Codes $\{s^{(16)}\}$ generated is also orthogonal. This particular example was demonstrated in Condition 3 earlier. A second systematic way of constructing Orthogonal Structured Codes is to use a Hadamard matrix as the seed set. A Hadamard matrix can be constructed for any integer power of 2 giving $m=w=2^s$. Since the rows of an Hadamard matrix are always orthogonal then the Structured Codes generated are also orthogonal. A third systematic way of constructing Orthogonal Structured Codes is also based on the use of a binary sequence $\{a_n\}=(a_0, a_1, a_2, \ldots a_{w-1})$ of length w that is cyclically distinct, quasi-balanced and satisfies the optimal periodic autocorrelation condition $$R(\tau) = \begin{cases} w & \text{for } \tau = 0 \\ \pm 1 & \text{for } \tau \neq 0 \end{cases}.$$

Firstly, a set of sequences is constructed from the w left or right cyclical shifts of $\{a_n\}$. Secondly, if $R(\tau)=-1$ for $\tau \neq 0$ then an additional sequence element equal to $\{-1\}$ is appended to each sequence in the set and an additional sequence with all sequence elements equal to $\{-1\}$ is appended to the set. Alternatively, if $R(\tau)=+1$ for $\tau \neq 0$ then an additional sequence element equal to $\{+1\}$ is appended to each sequence in the set and an additional sequence with all sequence elements equal to $\{+1\}$ is appended to the set. The resulting set of sequences thus form an orthogonal seed set.

Examples of sequences that are quasi-balanced and fulfill the optimal periodic autocorrelation condition include all m-sequences, the binary Barker sequences (++−), (+++−−+−) and (+++−−−+−−+−), Legendre sequences when $w=4^{k-1}$ for integer k and certain GMW sequences. Other binary sequences that fulfill these conditions do exist. The procedure for constructing an orthogonal seed set when $\{a_n\}$ is cyclically distinct, quasi-balanced and satisfies the optimal periodic autocorrelation condition is illustrated by way of example below for $\{a_n\}$=(+++−+−−), i.e. an m-sequence.

| $\{a^{(8)}\}$ | Seed Set |
|---|---|
| $\{a_n^{(0)}\}$ | +++−+−−− |
| $\{a_n^{(1)}\}$ | ++−+−−+− |
| $\{a_n^{(2)}\}$ | +−+−−++− |
| $\{a_n^{(3)}\}$ | −+−−+++− |
| $\{a_n^{(4)}\}$ | +−−+++−− |
| $\{a_n^{(5)}\}$ | −−+++−+− |
| $\{a_n^{(6)}\}$ | −+++−+−− |
| $\{a_n^{(7)}\}$ | −−−−−−−− |

A fourth systematic way to construct a set of Orthogonal Structured Codes is to use a small set of Orthogonal Structured Codes as the seed set in the construction of a larger set of Orthogonal Structured Codes. A fifth systematic way to construct a set of Orthogonal Structured Codes is to select the seed set from a set of orthogonal Gold sequences.

One of the main constraints on a wireless communication system is the interference produced by co-channel effects, multiple access effects and multipath propagation effects. The effectiveness of spread spectrum techniques to combat the interference depends on the properties of the signature sequences used to spread the spectrum. The Structure Codes possess good autocorrelation and crosscorrelation properties for spread spectrum systems. The Orthogonal Structured Codes are of particular significance because each code is orthogonal to every other code in the set. Wireless communication networks based on spread spectrum techniques frequently use orthogonal sequences in order to cancel out the cross-interference between different sequences when correlated simultaneously in the same frequency band. Until now the set of orthogonal sequences most commonly used is the Walsh codes taken from the rows of a Hadamard matrix. However, only one set of Walsh codes exist per code length N, where N must be an integer power of two. The sequence construction algorithms described above extends the number of sets of Orthogonal Structured Codes per code length N. More importantly, the algorithms are capable of systematically constructing multiple sets of Orthogonal Structured Codes for most practical sequence lengths and beyond. In addition, a very useful property of Orthogonal Structured Codes is that they form a Complementary Set of sequences. That is, the aperiodic autocorrelation function of all sequences in a set of Orthogonal Structured Codes sum to zero for every time shift, except the zero shift.

The flexibility of the construction rule for generating sets of Orthogonal Structured Codes is illustrated by way of example when $m=2^3$, that is, $p=2$ and $s=3$. Firstly, an orthogonal seed set $\{a^{(8)}\}$ is constructed using the m-sequence $\{a_n\}$=(+++−+−−) which is cyclically distinct, quasi-balanced and satisfies the optimal periodic autocorrelation condition.

| $\{a^{(8)}\}$ | Seed Set |
|---|---|
| $\{a_n^{(0)}\}$ | +++−+−−− |
| $\{a_n^{(1)}\}$ | ++−+−−+− |
| $\{a_n^{(2)}\}$ | +−+−−++− |
| $\{a_n^{(3)}\}$ | −+−−+++− |
| $\{a_n^{(4)}\}$ | +−−+++−− |
| $\{a_n^{(5)}\}$ | −−+++−+− |
| $\{a_n^{(6)}\}$ | −+++−+−− |
| $\{a_n^{(7)}\}$ | −−−−−−−− |

In this example, each sequence in the seed set has length $w=8$. We construct $w=8$ cosets using the procedure described above for i=0, 1, 2, 3, 4, 5, 6 and 7 as illustrated below.

| $Z_m$ | $Z_p[x]$ | $\{C^{(8)}\}_i$ | $\{C^{(8)}\}_0$ | $\{C^{(8)}\}_1$ | $\{C^{(8)}\}_2$ | $\{C^{(8)}\}_3$ |
|---|---|---|---|---|---|---|
| 0 | 0 | $\{C_n^{(0)}\}_i$ | +++−+−−− | +++−+−−− | +++−+−−− | −−−+−+++ |
| 1 | 1 | $\{C_n^{(1)}\}_i$ | ++−+−−+− | ++−+−−+− | −−+−++−+ | ++−+−−+− |
| 2 | x | $\{C_n^{(2)}\}_i$ | +−+−−++− | −+−++−−+ | +−+−−++− | −+−++−−+ |
| 3 | x + 1 | $\{C_n^{(3)}\}_i$ | −++−−−+ | −+−−+++− | +−++−−−+ | −++−−−+ |
| 4 | $x^2$ | $\{C_n^{(4)}\}_i$ | +−−+++−− | −++−−−++ | −++−−−++ | +−−+++−− |
| 5 | $x^2$ + 1 | $\{C_n^{(5)}\}_i$ | ++−−−−+− | ++−−−−+− | −−+++−+− | −−+++−+− |
| 6 | $x^2$ + x | $\{C_n^{(6)}\}_i$ | +−−−−++ | −+++−+−− | −+++−+−− | −+++−+−− |
| 7 | $x^2$ + x + 1 | $\{C_n^{(7)}\}_i$ | ++++++++ | ++++++++ | ++++++++ | ++++++++ |

| $Z_m$ | $Z_p[x]$ | $\{C^{(8)}\}_i$ | $\{C^{(8)}\}_4$ | $\{C^{(8)}\}_5$ | $\{C^{(8)}\}_6$ | $\{C^{(8)}\}_7$ |
|---|---|---|---|---|---|---|
| 0 | 0 | $\{C_n^{(0)}\}_i$ | +++−+−−− | −−−+−+++ | −−−+−+++ | −−−+−+++ |
| 1 | 1 | $\{C_n^{(1)}\}_i$ | −−+−++−+ | −−+−++−+ | ++−+−−+− | −−+−++−+ |
| 2 | x | $\{C_n^{(2)}\}_i$ | −+−++−−+ | +−+−−++− | +−+−−++− | −+−++−−+ |
| 3 | x + 1 | $\{C_n^{(3)}\}_i$ | −+−−+++− | −+−−+++− | −+−−+++− | +−++−−−+ |
| 4 | $x^2$ | $\{C_n^{(4)}\}_i$ | +−−+++−− | +−−+++−− | −++−−−++ | −++−−−++ |
| 5 | $x^2$ + 1 | $\{C_n^{(5)}\}_i$ | −−+++−+− | ++−−−+−+ | −−+++−+− | ++−−−+−+ |
| 6 | $x^2$ + x | $\{C_n^{(6)}\}_i$ | +−−−−++ | −+++−+−− | +−−−−++ | +−−−−++ |
| 7 | $x^2$ + x + 1 | $\{C_n^{(7)}\}_i$ | ++++++++ | ++++++++ | ++++++++ | ++++++++ |

Since, a=x is a primitive element of the primitive polynomial $g(x)=x^3+x+1$ then the powers of a modulo $g(x)$ are $(a^0, a^1, a^2, a^3, a^4, a^5, a^6)=(1, x, x^2, x+1, x^2+x, x^2+x+1, x^2+1)$. Hence, $q=p^s=2^3$ and the corresponding Multiplication table $M(2^3)$ over $GF(2^3)$ modulo $g(x)=x^3+x+1$ is illustrated below.

| X | | 0 | $\alpha^0$ | $\alpha^1$ | $\alpha^2$ | $\alpha^3$ | $\alpha^4$ | $\alpha^5$ | $\alpha^6$ |
|---|---|---|---|---|---|---|---|---|---|
| | | 0 | 1 | x | $x^2$ | x + 1 | $x^2 + x$ | $x^2 + x + 1$ | $x^2 + 1$ |
| 0 | 0 | 0 | 0 | 0 | 0 | 0 | 0 | 0 | 0 |
| $\alpha^0$ | 1 | 0 | 1 | x | $x^2$ | x + 1 | $x^2 + x$ | $x^2 + x + 1$ | $x^2 + 1$ |
| $\alpha^1$ | x | 0 | x | $x^2$ | x + 1 | $x^2 + x$ | $x^2 + x + 1$ | $x^2 + 1$ | 1 |
| $\alpha^2$ | $x^2$ | 0 | $x^2$ | x + 1 | $x^2 + x$ | $x^2 + x + 1$ | $x^2 + 1$ | 1 | x |
| $\alpha^3$ | x + 1 | 0 | x + 1 | $x^2 + x$ | $x^2 + x + 1$ | $x^2 + 1$ | 1 | x | $x^2$ |
| $\alpha^4$ | $x^2 + x$ | 0 | $x^2 + x$ | $x^2 + x + 1$ | $x^2 + 1$ | 1 | x | $x^2$ | x + 1 |
| $\alpha^5$ | $x^2 + x + 1$ | 0 | $x^2 + x + 1$ | $x^2 + 1$ | 1 | x | $x^2$ | x + 1 | $x^2 + x$ |
| $\alpha^6$ | $x^2 + 1$ | 0 | $x^2 + 1$ | 1 | x | $x^2$ | x + 1 | $x^2 + x$ | $x^2 + x + 1$ |

Multiplication table over $GF(2^3)$ for $\alpha = x$ and $g(x) = x^3 + x + 1$

The seven non-zero rows of the Multiplication table can be used to construct seven distinct Addition tables. Addition table-1 constructed from the first non-zero row of the Multiplication table is illustrated below.

| + | 0 | 1 | x | $x^2$ | x + 1 | $x^2 + x$ | $x^2 + x + 1$ | $x^2 + 1$ |
|---|---|---|---|---|---|---|---|---|
| 0 | 0 | 1 | x | $x^2$ | x + 1 | $x^2 + x$ | $x^2 + x + 1$ | $x^2 + 1$ |
| 1 | 1 | 0 | x + 1 | $x^2 + 1$ | x | $x^2 + x + 1$ | $x^2 + x$ | $x^2$ |
| x | x | x + 1 | 0 | $x^2 + x$ | 1 | $x^2$ | $x^2 + 1$ | $x^2 + x + 1$ |
| $x^2$ | $x^2$ | $x^2 + 1$ | $x^2 + x$ | 0 | $x^2 + x + 1$ | x | x + 1 | 1 |
| x + 1 | x + 1 | x | 1 | $x^2 + x + 1$ | 0 | $x^2 + 1$ | $x^2$ | $x^2 + x$ |
| $x^2 + x$ | $x^2 + x$ | $x^2 + x + 1$ | $x^2$ | x | $x^2 + 1$ | 0 | 1 | x + 1 |
| $x^2 + x + 1$ | $x^2 + x + 1$ | $x^2 + x$ | $x^2 + 1$ | x + 1 | $x^2$ | 1 | 0 | x |
| $x^2 + 1$ | $x^2 + 1$ | $x^2$ | $x^2 + x + 1$ | 1 | $x^2 + x$ | x + 1 | x | 0 |

Addition table-1 over $GF(2^3)$ for $\alpha = x$ and $g(x) = x^3 + x + 1$

We construct a subset $\{b^{(q)}\}_i$ corresponding to each coset $\{c^{(m)}\}_i$ by concatenating the sequences of $\{c^{(m)}\}_i$ according to the rows of the Addition table $A(2^3)$, where $q = p^s = 2^3$. This procedure is facilitated by assigning the integer residue class $Z_{m=8} = \{0, 1, 2, 3, 4, 5, 6, 7\}$ to the polynomial residue class $Z_{p=2}[x] = \{1, x, x^2, x+1, x^2+x, x^2+x+1, x^2+1\}$ according to the sequential mapping $0 \rightarrow 0$, $1 \rightarrow 1$, $x \rightarrow 2$, $x^2 \rightarrow 3$, $x+1 \rightarrow 4$, $x^2+x \rightarrow 5$, $x^2+x+1 \rightarrow 6$ and $x^2+1 \rightarrow 7$. Then the i-th subset $\{b^{(8)}\}_i$ is illustrated below.

| $\{b^{(8)}\}_i$ | i-th Subset for $0 \leq i \leq 7$ |
|---|---|
| $\{b_k^{(0)}\}_i$ | $\{C_n^{(0)}\}_i \{C_n^{(1)}\}_i \{C_n^{(2)}\}_i \{C_n^{(4)}\}_i \{C_n^{(3)}\}_i \{C_n^{(6)}\}_i \{C_n^{(7)}\}_i \{C_n^{(5)}\}_i$ |
| $\{b_k^{(1)}\}_i$ | $\{C_n^{(1)}\}_i \{C_n^{(0)}\}_i \{C_n^{(3)}\}_i \{C_n^{(5)}\}_i \{C_n^{(2)}\}_i \{C_n^{(7)}\}_i \{C_n^{(6)}\}_i \{C_n^{(4)}\}_i$ |
| $\{b_k^{(2)}\}_i$ | $\{C_n^{(2)}\}_i \{C_n^{(3)}\}_i \{C_n^{(0)}\}_i \{C_n^{(6)}\}_i \{C_n^{(1)}\}_i \{C_n^{(4)}\}_i \{C_n^{(5)}\}_i \{C_n^{(7)}\}_i$ |
| $\{b_k^{(3)}\}_i$ | $\{C_n^{(4)}\}_i \{C_n^{(5)}\}_i \{C_n^{(6)}\}_i \{C_n^{(0)}\}_i \{C_n^{(7)}\}_i \{C_n^{(2)}\}_i \{C_n^{(3)}\}_i \{C_n^{(1)}\}_i$ |
| $\{b_k^{(4)}\}_i$ | $\{C_n^{(3)}\}_i \{C_n^{(2)}\}_i \{C_n^{(1)}\}_i \{C_n^{(7)}\}_i \{C_n^{(0)}\}_i \{C_n^{(5)}\}_i \{C_n^{(4)}\}_i \{C_n^{(6)}\}_i$ |
| $\{b_k^{(5)}\}_i$ | $\{C_n^{(6)}\}_i \{C_n^{(7)}\}_i \{C_n^{(4)}\}_i \{C_n^{(2)}\}_i \{C_n^{(5)}\}_i \{C_n^{(0)}\}_i \{C_n^{(1)}\}_i \{C_n^{(3)}\}_i$ |
| $\{b_k^{(6)}\}_i$ | $\{C_n^{(7)}\}_i \{C_n^{(6)}\}_i \{C_n^{(5)}\}_i \{C_n^{(3)}\}_i \{C_n^{(4)}\}_i \{C_n^{(1)}\}_i \{C_n^{(0)}\}_i \{C_n^{(2)}\}_i$ |
| $\{b_k^{(7)}\}_i$ | $\{C_n^{(5)}\}_i \{C_n^{(4)}\}_i \{C_n^{(7)}\}_i \{C_n^{(1)}\}_i \{C_n^{(6)}\}_i \{C_n^{(3)}\}_i \{C_n^{(2)}\}_i \{C_n^{(0)}\}_i$ |

Then, a set of Orthogonal Structured Codes $\{s^{(64)}\}$ which contains 64 orthogonal sequences, $\{s_i^{(\cdot)}\}$, each of length 64 is constructed by sequentially concatenating the subsets $\{b^{(8)}\}_i$ for i=0, 1, 2, 3, 4, 5, 6 and 7 as illustrated below.

orthogonal between sets. However, the inphase crosscorrelation value between sequences belonging to different sets derived from the same primitive element is always equal to $N^{1/2}$ (i.e. 8 in this case) since the corresponding Addition tables are guaranteed to have only one coincident element per column. Furthermore, since there are exactly $\phi(p^s-1)=\phi(2^3-1)=6$ primitive elements, corresponding to the residue polynomials in variable x modulo g(x), then the total number of sets of Orthogonal Structured Codes that can be con-

| $\{S^{(64)}\}$ | Orthogonal Structured Codes 64 × 64 |
|---|---|
| $\{S_k^{(0)}\}$ | +++-+---++-+---+-+-+--++-+--+++--+-++---++---+-+++++++++++---+-+ |
| $\{S_k^{(1)}\}$ | ++-+---+-+++-+---+-++---+++---+-+-++-+--++-+++++++++---+-+++--+++-- |
| $\{S_k^{(2)}\}$ | +-+--++-+-++--+++++-+---+--+-+++-+--+-+-+--++--+++--+-+++++++++ |
| $\{S_k^{(3)}\}$ | +--+++--++---+-++---+-+++++-+---++++++++--+--++-+--++---+++-+--+- |
| $\{S_k^{(4)}\}$ | +-++---++-+--++--++-+--+-+++++++++-+---+--++-+--++---+++-+----+-++ |
| $\{S_k^{(5)}\}$ | +---+-+++++++++++--+++--+-+--++-+---+-++++-+---+-+-+-+-++---+ |
| $\{S_k^{(6)}\}$ | +++++++++---+-+++---+--+--+-+-+++---++-+--+-+-+++---+-+++--+-++ |
| $\{S_k^{(7)}\}$ | ++----+-++--+++-+++++++++++---+--+-+---+-+++-++---++-+--++-+++-+--- |
| $\{S_k^{(8)}\}$ | +++-+---++-+---+-+-+--++--+-++---++-+-++-+++--+---+++++++++---+-+ |
| $\{S_k^{(9)}\}$ | ++-+---+-+++-+--+-+++---+-+-+-+--++-+++++++++-+++-+---++---+-++ |
| $\{S_k^{(10)}\}$ | -+-++--+-+-+--+++-+++-++--++--+-++---+--++---+-+---++++-+-++++++++ |
| $\{S_k^{(11)}\}$ | -++--+++++--+-+++-+--++---+-++-+--+++++++++-+-++-+--+++-+--+-+- |
| $\{S_k^{(12)}\}$ | -+---+++-+-++--+++-+--+-+++++++++-+---++--+-+--++-+---+++++-+-- |
| $\{S_k^{(13)}\}$ | --+++-+-+++++++++--+--++-+--+++--++---+++++-+---+--+-+-+-++---+++ |
| $\{S_k^{(14)}\}$ | +++++++++--+-+++-+--+-+-+--++---++-+-+---+++--+-+++---+----+-++ |
| $\{S_k^{(15)}\}$ | ++---+-+-++--+-+++++++++++---+++-+----+--+++-+-+--++-+-++++-+--- |
| $\{S_k^{(16)}\}$ | +++-+----+-++-+--+-+-++---++-+-+--+++---+-++++++++--+++-+- |
| $\{S_k^{(17)}\}$ | --+-++-+++++-+--++-+--+--+-+-+-++-++-++++++++++++++-+---++-+-++ |
| $\{S_k^{(18)}\}$ | +--+-++-+-+--++++-+---+++-+----++--+---+-++-+---+++-+-++++++++ |
| $\{S_k^{(19)}\}$ | -++--++-+++--+-+++-+--+--+++++++++++-++-+-+--+-+--+-+-++-+ |
| $\{S_k^{(20)}\}$ | +-++---++-+--++---+-++-+++++++++-+----+++-+--++---+-++++-+-- |
| $\{S_k^{(21)}\}$ | -+++-+--+++++++++++--+++--++--+++--+-+--+--+-+--+-++-++-+++---+ |
| $\{S_k^{(22)}\}$ | ++++++++++-+++-+---+-+-+--+-++---++-+--+-+-+++-++-+----+-++--++ |
| $\{S_k^{(23)}\}$ | --+++-+--+-++--++++++++++-+---+-+++-+----+---+++-++-+-++-+- |
| $\{S_k^{(24)}\}$ | ---+-+++++-+---+-+--+-+-++--+++--+-+--+--+++-+--++++++++---+++-+- |
| $\{S_k^{(25)}\}$ | ++-+--+-+--+++++++-+---++--+-+-+-+-++++++++++++---+++-+---+++-- |
| $\{S_k^{(26)}\}$ | -+-++--++--+-+-+++-+++---+-+-+-+-+---+++---+--+++-+-++++++++ |
| $\{S_k^{(27)}\}$ | +--+++---+++-+--++-++--++-++++++++++-+-+++--+-++--+-+++-+-- |
| $\{S_k^{(28)}\}$ | +-++---+-+--++--+++-+--+-+++++++---+-+++--+++-+-+-++---+++-+-- |
| $\{S_k^{(29)}\}$ | -+++-+--+++++++++++--+++--+-+--+-+++-+----+-+++++-+--+-+-+-++--+ |
| $\{S_k^{(30)}\}$ | +++++++++-+++-+--+--+-+-++--++-+-+-+-+---+-++---+++-+-++-+++--+ |
| $\{S_k^{(31)}\}$ | -+++-+-+--+++--+++++++++--+++-+---+--+-++-+---++-+-++---+++ |
| $\{S_k^{(32)}\}$ | +++-+----+-++-+--+-+-++--+++---+-+++-+---+-++++++++++--+++-+-- |
| $\{S_k^{(33)}\}$ | --+-++-++++-+---+-+--+-++--+++---+++----+-+++++++++--+-++-+++-- |
| $\{S_k^{(34)}\}$ | -+-++--++-+--++-+-+--+++-+---+++-+-+---+-+++-+--+++-+-++++++++ |
| $\{S_k^{(35)}\}$ | +--+++--+++-+--++-+++++++-+---+++++++++--++-+--+-+-+++-++-+ |
| $\{S_k^{(36)}\}$ | -+--+++-+-++--+-+--+-+-+-++++++-+----+++-+-+--+++-+--+-+--++ |
| $\{S_k^{(37)}\}$ | +---+-+++++++++++--+++---+--+-+---+++-+-+++-+----+-++-+-+--+++ |
| $\{S_k^{(38)}\}$ | ++++++++++--+-++-+++--+-+--+-++--+++++-++++++---+--+-++-+-++ |
| $\{S_k^{(39)}\}$ | --+++-+--+---+++-+++++++++--+-++-+---+--+-++-+-++---+--++++-+- |
| $\{S_k^{(40)}\}$ | ---+-+++-+---+-++-+-++--+-+++--+-++--+-++-+++-+++++++++---+-+ |
| $\{S_k^{(41)}\}$ | --+-++-+---+-+++--+-+++-++---++-+--+-+++++++++++---+-+---+++-- |
| $\{S_k^{(42)}\}$ | +-+--++-+---++-+---+-+++-++---+-++-+---+-+++-+---+-+++-++-+ |
| $\{S_k^{(43)}\}$ | +--+++---+++-+---+-+-+++++++++++--++--+-++-+-++-+ |
| $\{S_k^{(44)}\}$ | -+--+++-+--+-++-+-+--++-++++++---+-++++---+-++-+--+--+++-+- |
| $\{S_k^{(45)}\}$ | -+++-+--+-++++++++---++--+-+--++-++--+---+-+++--+-++-+-+---+++- |
| $\{S_k^{(46)}\}$ | ++++++++---+-++---+++-+--+-++-+---++-+---+-++-+++++++++-+ |
| $\{S_k^{(47)}\}$ | ++---+-+-++--+++-+++++++++---+-+++-+----++-+-+---++-+---+++ |
| $\{S_k^{(48)}\}$ | ---+-+++++-+--+---+-++-+-++-+---+--+--+-+++++++++++---+-++-+ |
| $\{S_k^{(49)}\}$ | ++-+--+----+++-+---+++---+-+-+--+-+++++++++++---+-+-++---++ |
| $\{S_k^{(50)}\}$ | +-+--++---+-+++-+--+++++-++--+--+-++---+-+--+-+++-+-++++++++ |
| $\{S_k^{(51)}\}$ | -++---++-+++-+---+---+-++++++++++---+-+-+--+---+-+++-+++---+- |
| $\{S_k^{(52)}\}$ | -+--+++-+--++-++-+---+-++++++---+-+++-+++-+-+---+++---+-++ |
| $\{S_k^{(53)}\}$ | +---+-+++++++++-++---+++-+--+---+++-+----+-+++++-+-+---+-+++ |
| $\{S_k^{(54)}\}$ | ++++++++---+-++---+++-+---+-+++-+-+--+-+---+-++---+-+---++- |
| $\{S_k^{(55)}\}$ | --+++-+-+-+---+++++++++++-++--+---++-+++-+--++-+---+-++---++ |
| $\{S_k^{(56)}\}$ | ---+-+++-+-++---++-+--++-+--+-+---+---++++++++++-+--+--++---+ |
| $\{S_k^{(57)}\}$ | --+-++-+---+-+++-++---+-+--+-++-+++++++++---+-+-++-+++---++ |
| $\{S_k^{(58)}\}$ | -+-++--++-++--+---+-++++-+---++-+--+---++-+---+++++-+-+++++++++ |
| $\{S_k^{(59)}\}$ | -++---++++-+-++----+-+++++++++++--+++-+++-+-+---+-+-+-+ |
| $\{S_k^{(60)}\}$ | +-++---+-+--++--+++-+-+-+++++++++-++++++++-+---++-+---+++-+-- |
| $\{S_k^{(61)}\}$ | +---+-+++++++++-++---++--+-++---+-+---+-+-++---+-+-++-++-++---+ |
| $\{S_k^{(62)}\}$ | ++++++++---+-+++++---+-++---+-+--++---+-++---+-+--+-+++-+-++--+ |
| $\{S_k^{(63)}\}$ | ++---+-+-++--+++++++++++-+-+++--+--+-+++-++--+-+-+-+--+-+-+++ |

For each primitive element a we can construct a total of seven distinct sets of Orthogonal Structured Codes from the same seed set because seven distinct Addition tables can be derived from any one primitive element. While the sequences are orthogonal within each set they are not structed from each primitive polynomial is 42 (i.e. 6×7). And since there are exactly $\phi(p^3-1)/s=\phi(2^3-1)/3=2$ primitive polynomials of degree s=3 in $GF(2^3)$, which are $g(x)=x^3+x+1$ and $g(x)=x^3+x^2+1$, then it is possible to construct a total of 84 (i.e. 2×6×7) distinct sets of Orthogonal Structured Codes from one seed set. In summary, when $m=p^s=w$ then there are $\phi(p^s-1)/s$ primitive polynomials of degree s in $GF(p^s)$ each with $\phi(p^s-1)$ primitive elements each with $p^s-1$ distinct Addition tables. Consequently, the total number of distinct sets of Orthogonal Structured Codes that can be constructed from a common seed set for the condition m=w is given by $$\frac{\phi^2(p^s-1)}{s} \times (p^s - 1).$$

Since the number of orthogonal seed sets available is large when m=w>4 then the overall numbers of sets of Orthogonal Structured Codes that can be constructed is very large indeed. For example, the following table illustrates six distinct orthogonal seed sets each of which can be used to construct a set of 64 Orthogonal Structured Codes. The table is by no means exhaustive and many more orthogonal seed sets containing m=8 sequences each of length w=8 exist. The example shown includes an orthogonal construction on the two m-sequences of length seven, a set of Walsh codes taken from an 8×8 Hadamard matrix, an 8×8 set of orthogonal Gold sequences and two arbitrary 8×8 sets of orthogonal sequences. For the example being illustrated a total of 504 distinct sets of Orthogonal Structured Codes each containing 64 orthogonal sequences of length 64 could be constructed using the six orthogonal seed sets identified. Clearly, such sequences are ideal for cellular mobile application where a large number of sets of sequences with low correlation values are required.

3). It is conjectured that this is the only incident when the Addition tables are not distinct. However, if the crosscorrelation condition is relaxed between sets belonging to different Addition tabled derived from the same primitive element, then for this case an alternative form of the Addition table can be used which involves a rotation or exchange of the elements as illustrated below.

| + | | 0 | $\alpha^0$ | $\alpha^1$ | $\alpha^2$ |
|---|---|---|---|---|---|
|   |   | 0 | 1 | x | x + 1 |
| 0 | 0 | 0 | 1 | x | x + 1 |
| $\alpha^0$ | 1 | 1 | 0 | x + 1 | x |
| $\alpha^1$ | x | x | x + 1 | 0 | 1 |
| $\alpha^2$ | x + 1 | x + 1 | x | 1 | 0 |

Addition table over $GF(2^2)$ for $\alpha = x$ and $g(x) = x^2 + x + 1$

| | Modified Addition table based on $A(2^2)$ for $\alpha = x$ | | |
|---|---|---|---|
| 0 | 1 | x | x + 1 |
| 1 | x + 1 | 0 | x |
| x | 0 | x + 1 | 1 |
| x + 1 | x | 1 | 0 |

Alternative Addition table over $GF(2^2)$ for $\alpha = x$ and $g(x) = x^2 + x + 1$ The alternative Addition table might be used in a spread spectrum communication system where a single set is deployed once, thereby avoiding crosscorrelation with other sets, while ensuring that the sequences of the set deployed are cyclically distinct thereby guaranteeing 'orthogonality' in multipath. If several sets of Orthogonal Structured Codes are to be deployed simultaneously then the alternative Addition table is not preferable.

| $\{a^{(8)}\}_i$ | m-seq. Set 1 | m-seq. Set 2 | Walsh Codes | Orthogonal Gold Codes | Arbitrary Set 1 | Arbitrary Set 2 |
|---|---|---|---|---|---|---|
| $\{a_n^{(0)}\}_i$ | +++-+--- | +++--+-- | ++++++++ | ++--+-++ | +++-++-- | ++--+++- |
| $\{a_n^{(1)}\}_i$ | ++-+---+ | ++--+-+- | +-+-+-+- | +-++++++ | ++-++-+- | +-+-++-+ |
| $\{a_n^{(2)}\}_i$ | +-+--++- | +--+-++- | ++--++-- | ++-+-++- | +-++-++- | -++-+-++ |
| $\{a_n^{(3)}\}_i$ | -+---+++ | --+-+++- | +--++--+ | +++-++-- | -+++---- | -----+++ |
| $\{a_n^{(4)}\}_i$ | +--+++-- | -+-+++-- | ++++---- | +-+---+- | +++---++ | ++------+ |
| $\{a_n^{(5)}\}_i$ | --+++-+- | +-+++--- | +-+--+-+ | ++++---+ | ++-+-+-+ | +-+---+- |
| $\{a_n^{(6)}\}_i$ | -+++-+-- | -+++-+-- | ++-----++ | +-----+-+ | +-+++--+ | -++--+-- |
| $\{a_n^{(7)}\}_i$ | -------- | -------- | +--+-++- | +--++--- | -+++++++ | ----+--- |

In summary, the set of Orthogonal Structured Codes constructed in this example are cyclically distinct. The term cyclically distinct is taken to mean that every sequence within the set is not a cyclical shift of any other sequence within the set and hence each sequence is periodic in N=64. This property is realised because the rows and columns of each Addition table are distinct. In general, it is conjectured that when $p \geq 2$ and $s \geq 3$ the Addition tables over $GF(p^s)$ will always be distinct and hence the resulting sets of Orthogonal Structured Codes will always be cyclically distinct. This property is specifically beneficial when the sequences are used in multipath since they will remain 'orthogonal' in multipath. This is in contrast to sets of Walsh Codes which are not cyclically distinct and hence do not remain orthogonal in multipath unless covered or masked by another pseudorandom sequence. When p=2 and s=2 the rows and columns of the Addition tables over GF(4) modulo $g(x)=x^2+x+1$ are not distinct (see the construction example given for Condition Using Structured Codes in a lightwave spread spectrum communication system is achieved by unipolar-bipolar correlation techniques. In general, unipolar-bipolar correlation introduces a disturbing term, namely an offset that can be removed by AC coupling the photodetector to the receiver preamplifier. The offset is caused by the one-zero imbalance of the sequences as well as the number of simultaneous sequence transmissions in the case of CDMA. In applications where DC coupling of the photodetector is needed, the off-set can be removed by using either balanced sequences or by using a complementary (second) channel that generates a differential signaling format; nominally the second channel being provided by wavelength division multiplexing techniques. Balanced Structured Codes are illustrated hereinafter for lightwave communication. However, Orthogonal Structured Codes may also be used to realise a differential unipolar-bipolar signaling scheme without the need for a second physical channel.

A set of Balanced Structured Codes can be constructed from a balanced seed set. The term balanced seed set is taken to mean that every sequence in the seed set has an equal number of "+1" and "−1" elements. When the seed set is balanced the resulting set of Structured Codes is also balanced. Sets of Structured Codes that are balanced have been called Balanced Structured Codes. Hence, the identification of balanced seed sets is specifically relevant to the generation of Balanced Structured Codes. A systematic way of constructing Balanced Structured Codes is also based on the use of a binary sequence $\{a_n\}=(a_0, a_1, a_2, \ldots a_{w-1})$ of length w that is cyclically distinct, quasi-balanced and satisfies the optimal periodic autocorrelation condition $$R(\tau) = \begin{cases} w & \text{for } \tau = 0 \\ \pm 1 & \text{for } \tau \neq 0 \end{cases}.$$

Firstly, a set of sequences is constructed from the w left or right cyclical shifts of $\{a_n\}$. Secondly, if $R(\tau)=-1$ for $\tau \neq 0$ then an additional sequence element equal to $\{-1\}$ is appended to each sequence in the set. Alternatively, if $R(\tau)=+1$ for $\tau \neq 0$ then an additional sequence element equal to $\{+1\}$ is appended to each sequence in the set. The resulting set of sequences thus form a balanced seed set. Examples of sequences that are quasi-balanced and fulfill the optimal periodic autocorrelation condition include all m-sequences, the binary Barker sequences (++−), (+++−−+−) and (+++−−−+−−+−), Legendre sequences when $w=4^{k-1}$ for integer k and certain GMW sequences. Other binary sequences that fulfill these conditions do exist. The procedure for constructing a balanced seed set when $\{a_n\}$ is cyclically distinct, quasi-balanced and satisfies the optimal periodic autocorrelation condition is illustrated by way of example below for $\{a_n\}=(+++−+−−)$, i.e. an m-sequence. In this example we note that m=7 while w=8.

| $\{a^{(7)}\}$ | Seed Set |
|---|---|
| $\{a_n^{(0)}\}$ | +++ − + − − − |
| $\{a_n^{(1)}\}$ | ++ − + − − + − |
| $\{a_n^{(2)}\}$ | + − + − − ++ − |
| $\{a_n^{(3)}\}$ | − + − − +++ − |
| $\{a_n^{(4)}\}$ | + − − +++ − − |
| $\{a_n^{(5)}\}$ | − − +++ − + − |
| $\{a_n^{(6)}\}$ | − +++ − + − − |

Another systematic way to construct a set of Balanced Structured Codes is to use a small set of Balanced Structured Codes as the seed set in the construction of a larger set of Balanced Structured Codes.

Algorithms are thus realised for constructing the Structured Codes. Additionally, specific sets of sequences have been identified for use in spread spectrum communication techniques.

Applications of the signature sequences will now be described with reference to specific transmitter and receiver architectures. Usually, the transmitter and receiver are combined at each end of the communication path for bi-directional communication. Thus, by way of example the transceiver design is based on an M-ary bi-orthogonal keying scheme. An alternative example would be an M-ary orthogonal keying scheme. In an M-ary bi-orthogonal keying scheme one of M possible symbols is transmitted during each symbol interval, where M>2. Each symbol represents a co-ordinate in a K-dimensional signal space using K=M/2 orthonormal basis functions. In M-ary bi-orthogonal keying the symbol set consists of M/2 orthonormal basis functions and their complements. For the transceiver designs presented, the orthonormal basis functions are chosen from sets of Orthogonal Structured Codes. Consequently, spectrum spreading and M-ary transmission are combined in a single bandwidth efficient modulation scheme. Though M-ary bi-orthogonal keying is an established digital modulation scheme, the use of Orthogonal Structured Codes as orthonormal basis functions is completely new.

In the description which follows the notation adopted is: $\{\phi_n^{(j)}\}$ denotes the j-th Orthogonal Structured Code with elements $\phi_n \in \{\pm 1\}$; $\{\Phi_n^{(j)}\}$ denotes the unipolar version of $\{\phi_n^{(j)}\}$ with elements $\Phi_n \in \{1,0\}$; and $\phi_j(t)$ and $\Phi_j(t)$ denote bipolar and unipolar waveform versions of $\{\phi_n^{(j)}\}$ and $\{\Phi_n^{(j)}\}$ respectively. In addition, d(t) and D(t) denote unit amplitude, rectangular bipolar and unipolar data waveforms, respectively.

In this general arrangement, the transmitter architecture is firstly described with reference to FIG. 1. Unipolar binary data D(t) is fed into a 1:k multiplexer at rate 1/T, where $k=\log_2 M$. At the multiplexer output, the (k−1) most-significant bits (MSB) are used to chose one from $K=M/2=2^{k-1}$ sequences thereby determining the symbol waveform. The least significant bit (LSB) determines whether or not the sequence is complemented thereby realising the other half of the symbol code-book. The resulting symbol waveform is then made available for transmission. The transmitter architecture is based on a standard M-ary bi-orthogonal keying scheme except that the symbol waveforms have the dual functionality of spreading the spectrum and acting as orthonormal basis functions. This is possible because the sequences are taken from sets of Orthogonal Structured Codes. In general, this may be expressed by $$\{\phi_n^{(j)}\}=\{s_n^{(j)}\}$$

for $0 \leq j \leq K-1$ and the maximum value of K is N.

Figure 2:
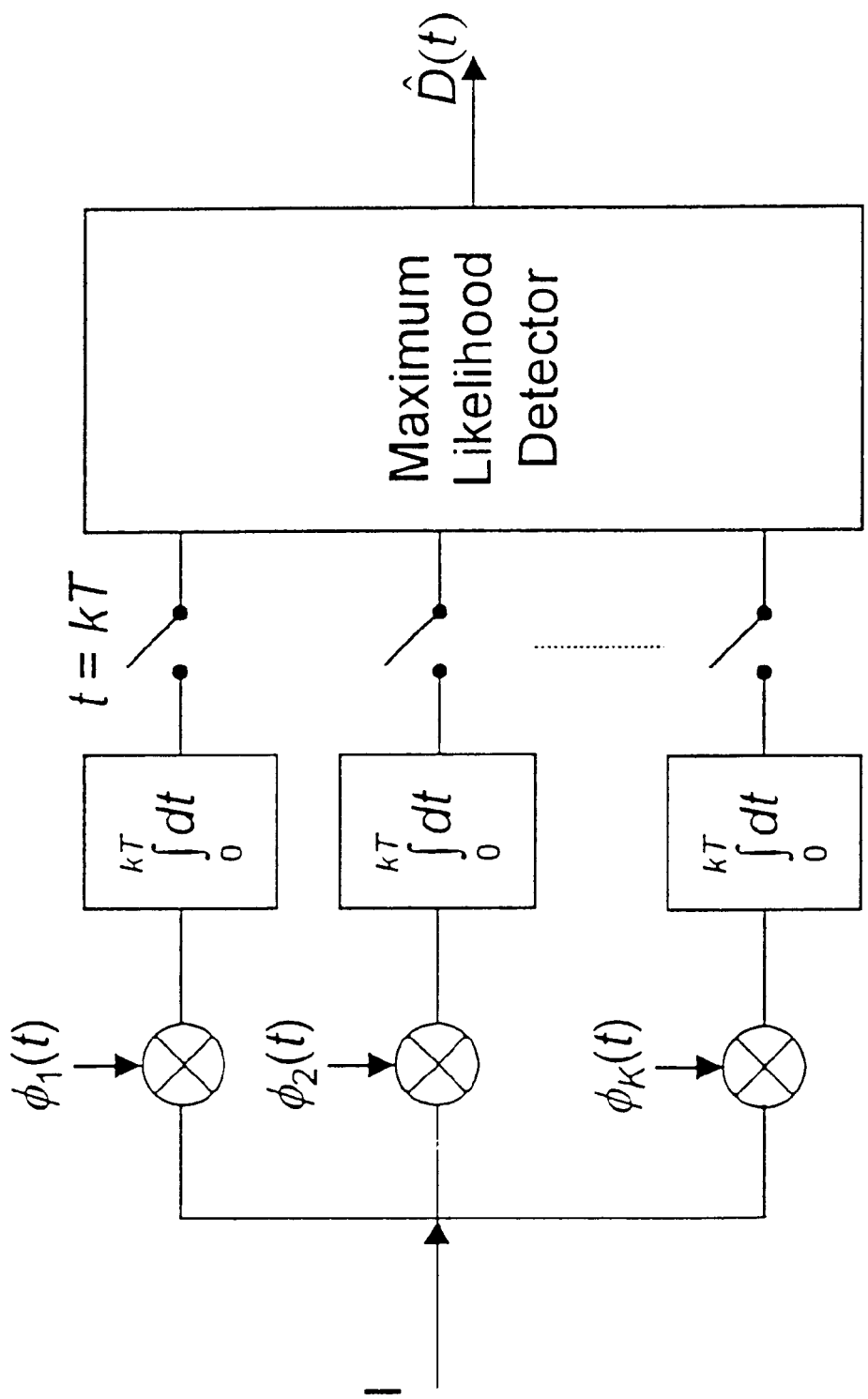
FIG. 2 is a schematic diagram of a receiver based on M-ary bi-orthogonal keying for use in a spread spectrum communication system.

FIG. 2 is a schematic diagram of a receiver design. For the M-ary transmitter architecture presented above, the corresponding receiver consists of a bank of K-correlators matched to the orthonormal basis functions $\phi_j(t)$, where $K=M/2=2^{k-1}$. The outputs from the correlators are passed to samplers and are sampled at time t=kT before being fed into a decision logic block where a maximum likelihood detection of the data transmitted is performed. For the M-ary bi-orthogonal scheme this involves a search for the greatest magnitude peak at the outputs of the bank of K-correlators and subsequently the polarity of the greatest magnitude peak. This information can then be used to uniquely identify the transmitted symbol and hence the corresponding data bits. The logic output is $\hat{D}(t)$, the estimate of D(t) the original unipolar binary data inputted to the transmitter.

Figure 3:
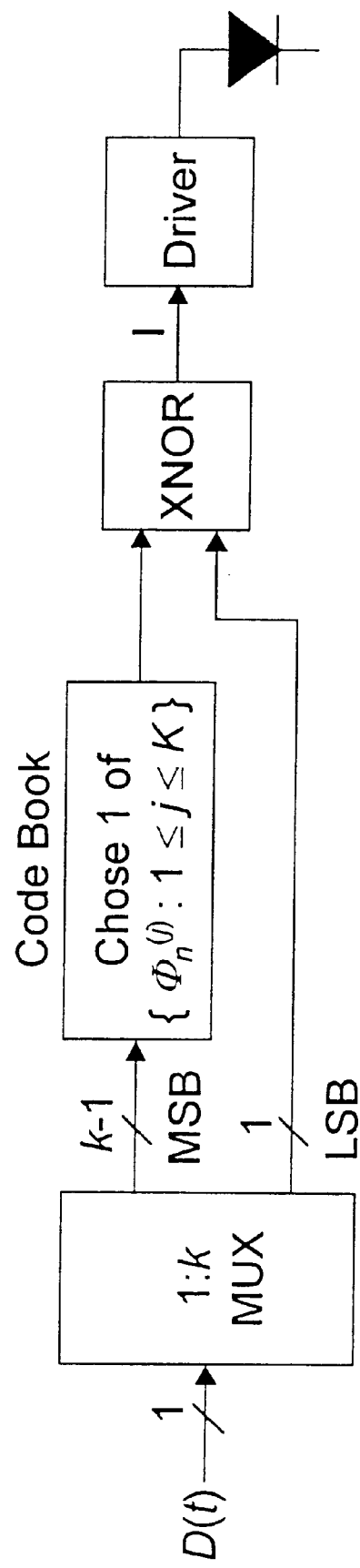
FIG. 3 is a schematic diagram of a transmitter based on M-ary bi-orthogonal keying for use in a wireless infrared spread spectrum communication system.
Figure 4:
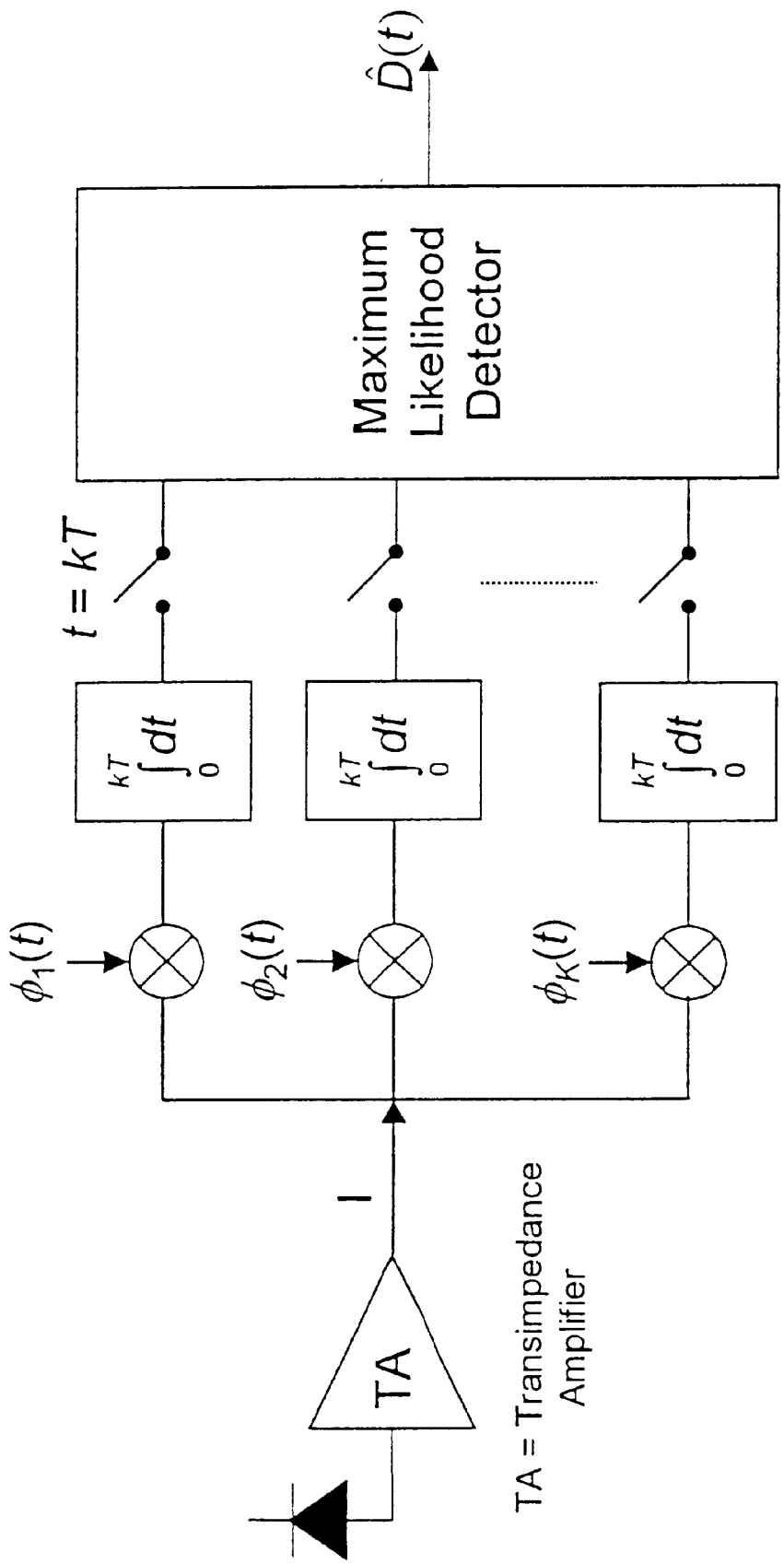
FIG. 4 is a schematic diagram of a receiver based on M-ary bi-orthogonal keying for use in a wireless infrared spread spectrum communication system.

In a first embodiment, a wireless communication system is disclosed. The transmitter and receiver architectures described with reference to FIGS. 1 and 2 are adapted for use with coded signals based on Orthogonal Structured Codes. Such generalised architectures may be used in any spread spectrum signaling scheme. For example, in a radio communications system the output of the transmitter shown in FIG. 1 can be directly carrier modulated using either amplitude, frequency or phase modulation techniques. In a wireless infrared communication system based on unipolar-bipolar correlation techniques, FIGS. 3 and 4 show schematic diagrams of the transmitter and receiver architectures incorporating the electro-optic interfaces. At the transmitter the same M-ary bi-orthogonal keying scheme is used to generate unipolar symbol waveforms which directly control a drive circuit that switches a lightwave source, such as a Light Emitting Diode or Laser Diode, on and off. As in the generalised architecture of FIG. 1, the orthonormal basis functions are obtained from sets of Orthogonal Structured Codes.

At the receiver shown in FIG. 4, the optical signal is detected by a photodiode or an array of photodiodes and amplified by a broadband transimpedance amplifier before being fed into a bank of K-correlators. The correlator outputs are passed through samplers to be sampled at time t=kT and then fed into a decision logic block that implements a maximum likelihood detection of the data transmitted.

Figure 5:
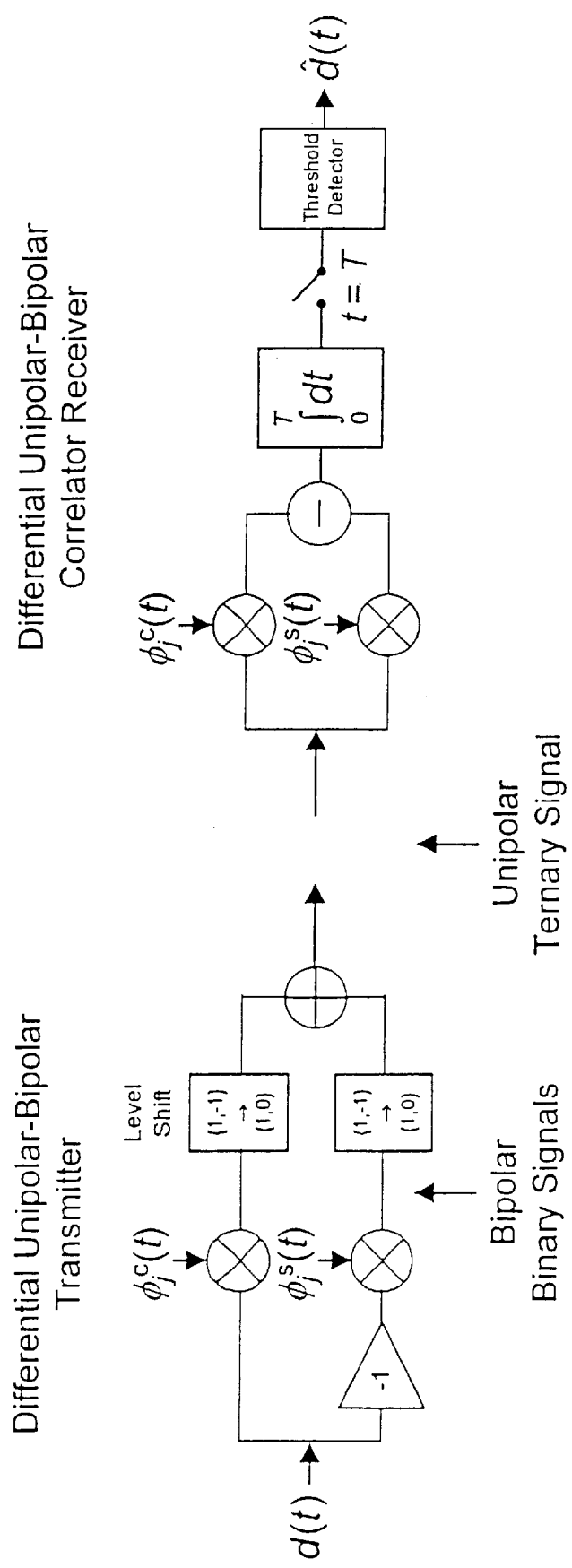
FIG. 5 is a schematic representation of a differential unipolar-bipolar signaling format.

When the photodiode is DC coupled to the receiver, the unipolar-bipolar correlation technique presented above generates an off-set if the spreading sequences are imbalanced. One method to remove this inherent off-set is to use Balanced Structured Codes as orthonormal basis functions. However, the performance of a full set of Balanced Structured Codes is inferior to the performance of a full set of Orthogonal Structured Codes. If the photodiode is AC coupled to the receiver then Orthogonal Structured Codes may be used without introducing a sequence dependent offset. In applications where DC coupling is required, the offset produced by imbalanced sequences can be removed efficiently by a differential unipolar-bipolar signaling format. FIG. 5 illustrates a schematic diagram of a differential unipolar-bipolar signaling scheme. In addition to removing the off-set effect, a differential unipolar-bipolar signaling scheme removes common mode interference. This is particularly useful for combating artificial ambient light interference, such as that produced by electronic-ballast-driven lamps, in an infrared wireless transmission embodiment.

Bipolar data d(t) at a rate of 1/T and its inverse −d(t) are spread by multiplication with the orthonormal basis functions $\phi_j^c(t)$ and $\phi_j^s(t)$, respectively, where $\phi_j^c(t)$ and $\phi_j^s(t)$ are an orthogonal pair of spreading sequences. In practice, $\phi_j^c(t)$ and $\phi_j^s(t)$ can be selected from a set of Orthogonal Structured Codes. As an Orthogonal Structured Code $\{s_n^{(j)}\}$ and its reverse sequence $\{\sigma_n^{(j)}\}$ form an orthogonal pair, it is recommended that $\phi_j^c(t)=\{s_n^{(j)}\}$ and $\phi_j^s(t)=\{\sigma_n^{(j)}\}$ are chosen to result in an efficient allocation of sequences. The orthogonal pair of signals are then converted from bipolar to unipolar format using Level Shifters, summed together and then transmitted on a unipolar channel such as a lightwave medium.

At the receiver, the total received signal s(t) is directly multiplied in parallel by the bipolar orthonormal basis functions $\phi_j^c(t)$ and $\phi_j^s(t)$. The outputs from the multipliers are differenced and the resulting difference signal is then integrated over the symbol period T. In a differential unipolar-bipolar signaling scheme, the in-phase value of the correlator output is the same as that obtained when a normal bipolar-bipolar signaling format is used.

The transmitter and receiver architectures shown in FIGS. 3 and 4 may be converted from a unipolar-bipolar signaling format to a differential unipolar-bipolar signaling format bit augmenting the M-ary bi-orthogonal keying scheme with the circuits shown in FIG. 5.

Figure 6:
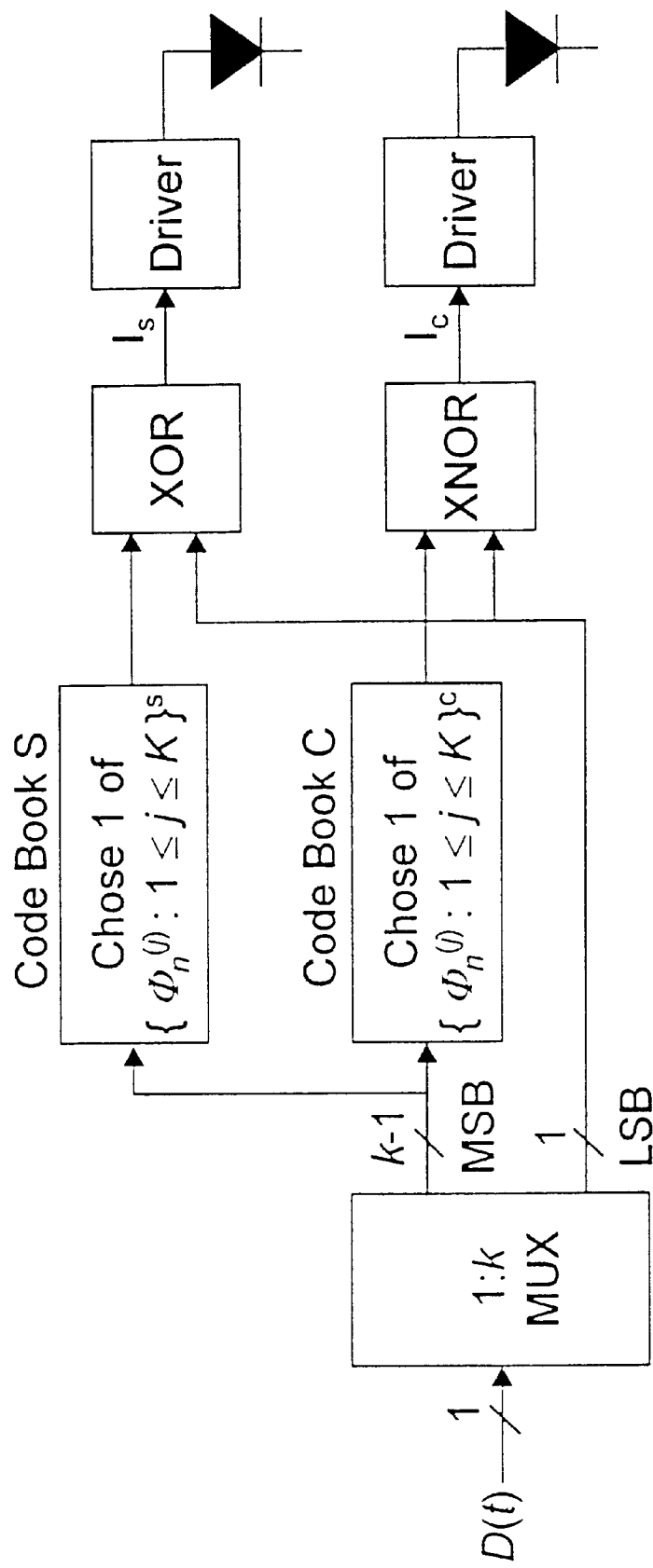
FIG. 6 is a schematic diagram of a transmitter based on M-ary bi-orthogonal keying and differential unipolar-bipolar signaling for use in a wireless infrared spread spectrum communication system.
Figure 7:
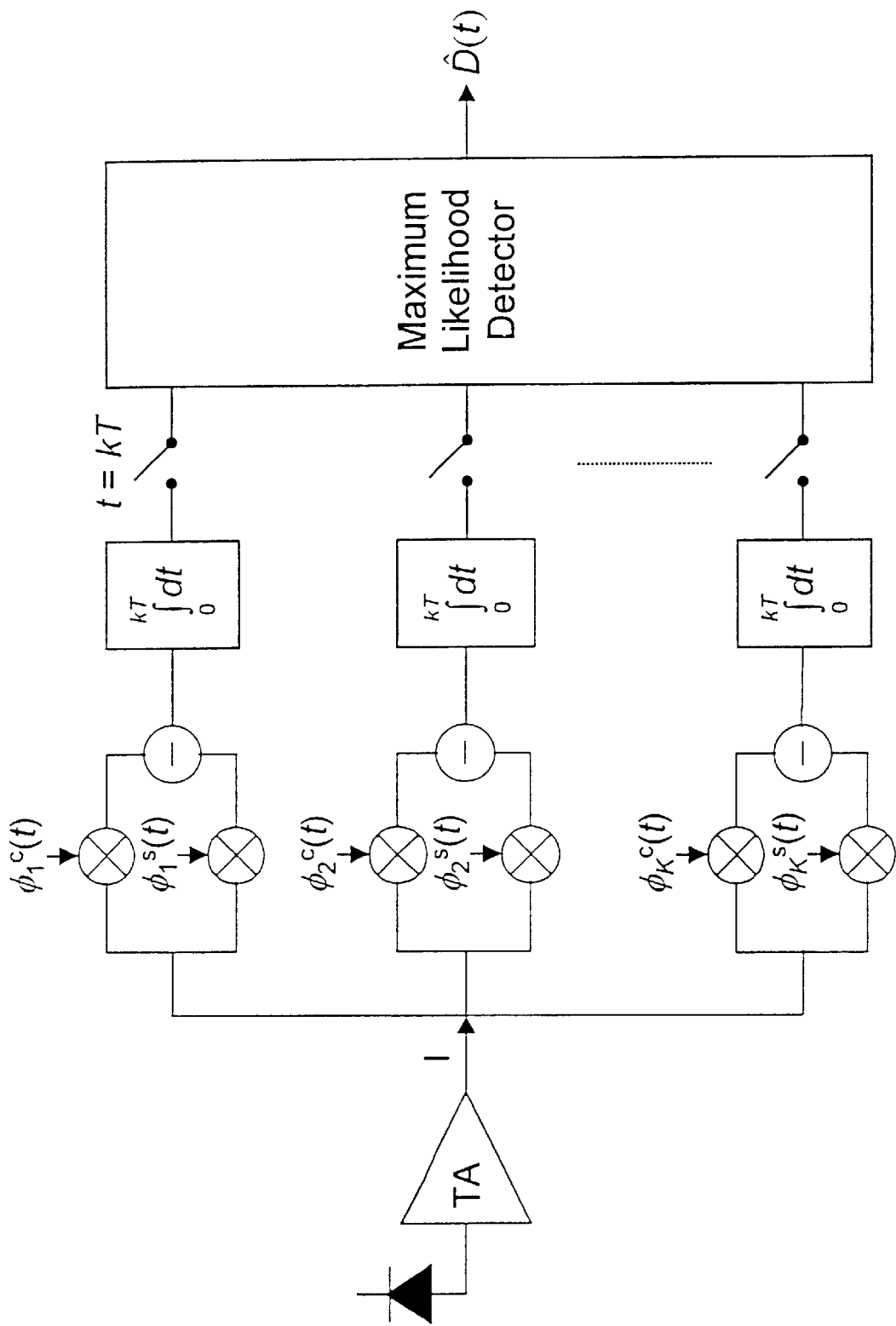
FIG. 7 is a schematic diagram of a receiver based on M-ary bi-orthogonal keying and differential unipolar-bipolar signaling for use in a wireless infrared spread spectrum communication system.

Consequently, in the receiver two multipliers are required per branch. A schematic diagram of an M-ary bi-orthogonal keying scheme incorporating differential signaling is shown in FIG. 6 while a schematic diagram of the corresponding receiver is shown in FIG. 7. In the transmitter, the differential symbol waveforms drive separate lightwave sources. Consequently, the summation of differential signals takes place on the lightwave channel. This configuration has the advantage that the drive circuits remain digital thereby avoiding non-linearity problems in the transmitter.

Figure 8:
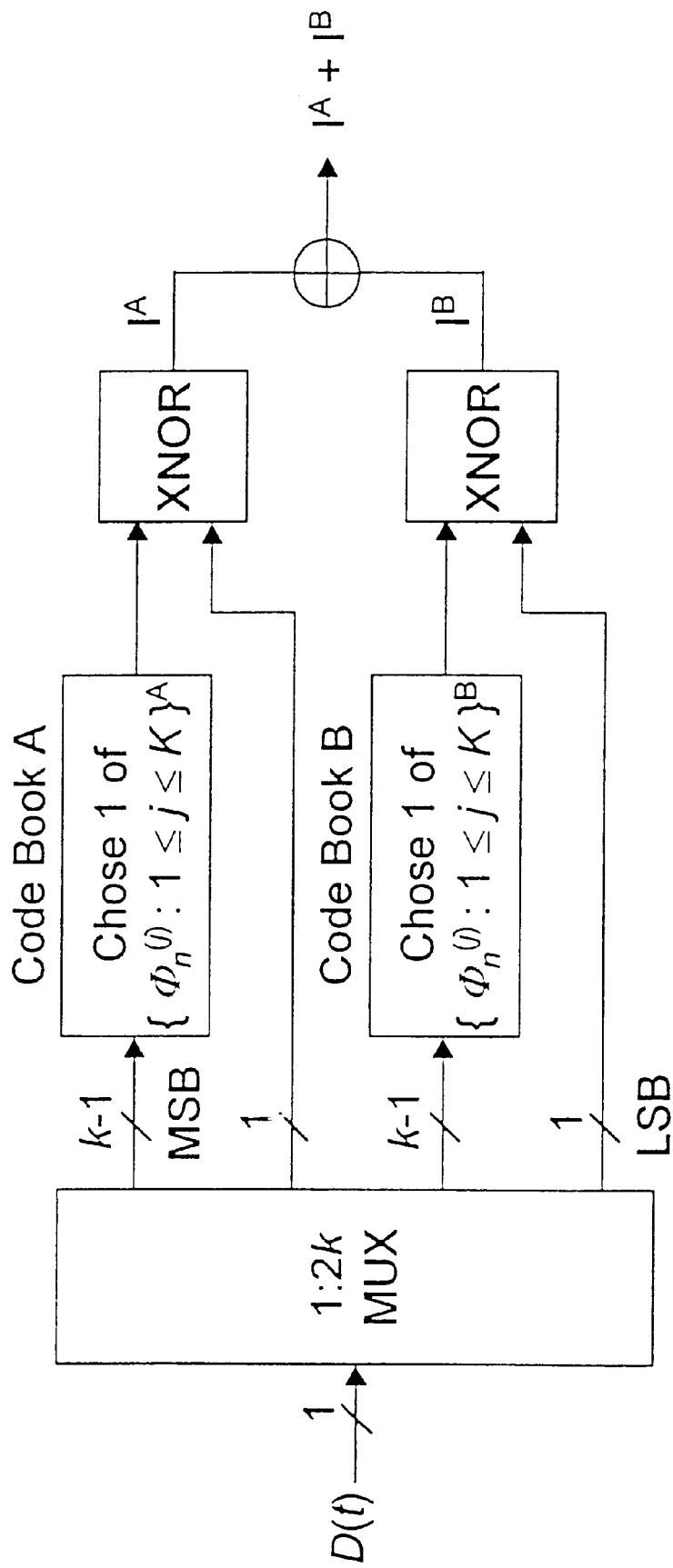
FIG. 8 is a schematic diagram of a transmitter based on M-ary bi-orthogonal keying and two distinct code sets that can be used in a spread spectrum communication system to double capacity.
Figure 9:
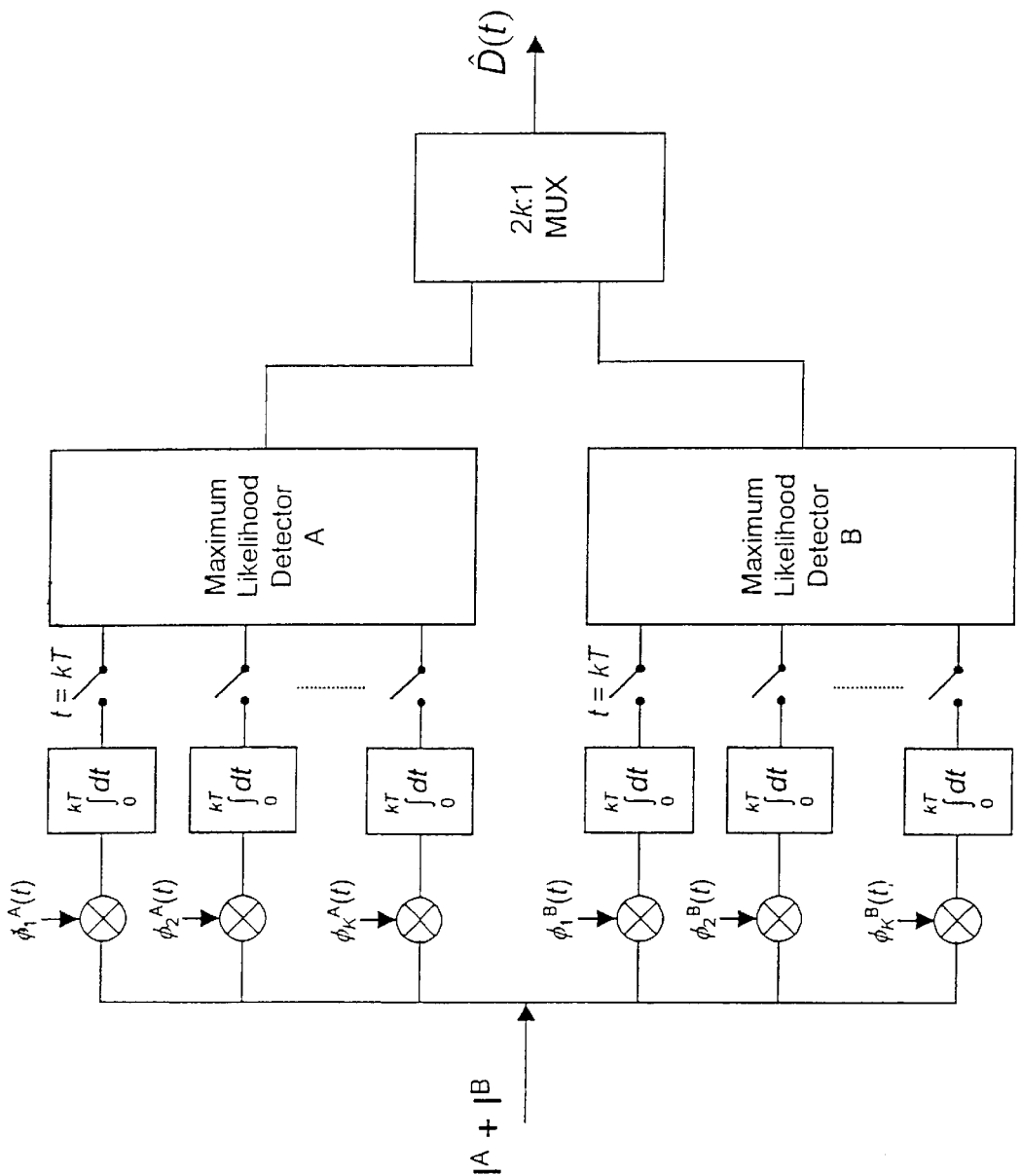
FIG. 9 is a schematic diagram of a receiver based on M-ary bi-orthogonal keying and two distinct code sets that can be used in a spread spectrum communication system to double capacity.

For a given sequence length N, the spectral efficiency of a spread spectrum communication system can be substantially increased by using two or more distinct sets of Orthogonal Structured Codes in one transceiver. FIGS. 8 and 9 show schematic diagrams of a transmitter and receiver, respectively, that use two distinct orthogonal code sets in an M-ary bi-orthogonal keying scheme. That is, the transceiver consists of two M-ary bi-orthogonal keying schemes combined in parallel but using two distinct code sets. In this case, the capacity of the communication link is doubled. In the transmitter, shown in FIG. 8, unipolar binary data D(t) is fed into a 1:2k multiplexer at rate 1/T, where k=$\log_2$M. The first k multiplexed data bits feed one branch of the M-ary bi-orthogonal keying scheme while the second k multiplexed data bits feed the other branch of the M-ary bi-orthogonal keying scheme. The receiver, shown in FIG. 9, consists of two banks of K-correlators; one matched to the first code set while the other bank is matched to the second code set. Two distinct maximum likelihood detectors are used to detect the data belonging to each parallel M-ary bi-orthogonal scheme. Once detected, the data from each branch is combined using a 2k:1 multiplexer. Ideally, the distinct code-sets should be orthogonal in order to avoid any crosscorrelation interference when two symbol waveforms are transmitted and received in parallel. In practice, the distinct code sets are not mutually orthogonal and hence cross-interference occurs. However, code sets can be chosen from the large number of Orthogonal Structured Codes such that the crosscorrelation interference does not cause transmission errors. An example of two such code sets for N 16 are the Orthogonal Structured Codes constructed on the seed sequence $\{a_n\}$=(+,+,+,−) using two distinct Addition tables derived from the same Multiplication table.

Figure 10:
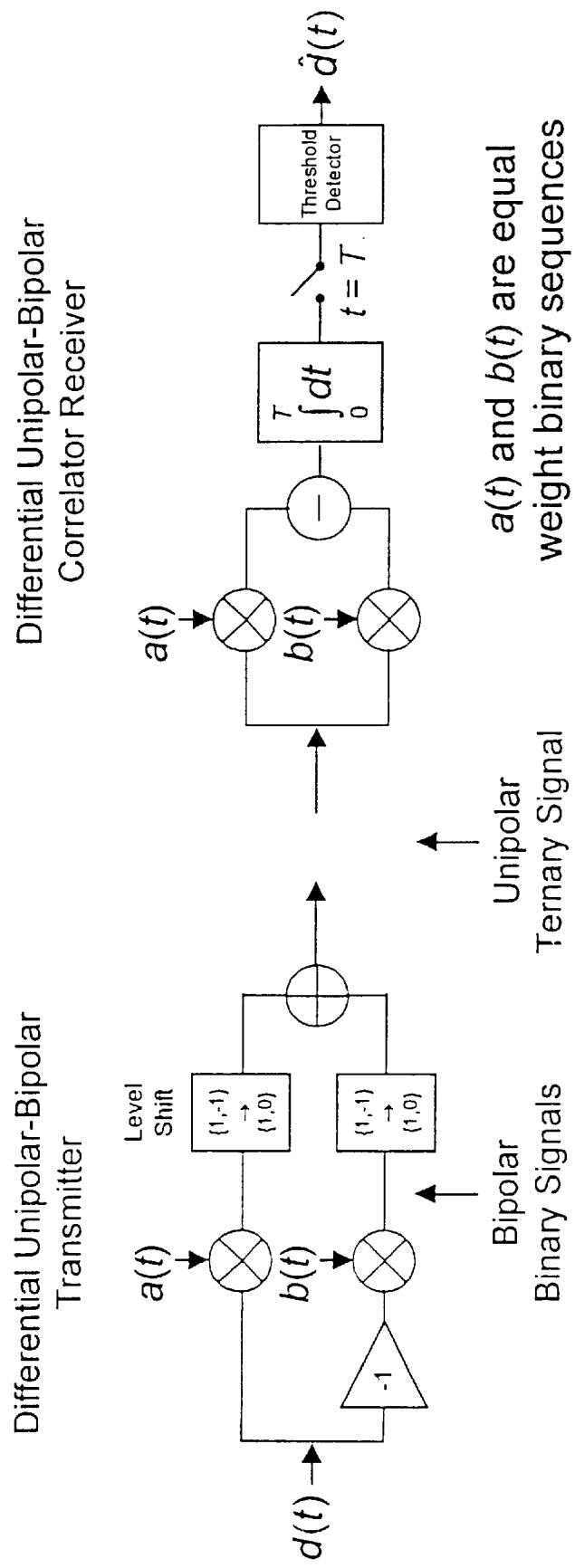
FIG. 10 is a schematic representation of a differential unipolar-bipolar signaling format for periodic binary sequences.

It is considered preferable, although not essential, that the spreading sequences in a differential unipolar-bipolar signaling format are orthogonal. If the only requirement is to remove a sequence dependent off-set, then any pair of periodic binary sequences $\{a_n\}$ and $\{b_n\}$ can be used providing that they have the same $\{1,0\}$ chip imbalance. This condition may be satisfied by using a sequence pair consisting of the sequence $\{a_n\}$ and its reverse sequence $\{b_n\}$= $\{\sigma_n\}$. A potential disadvantage of using a non-orthogonal sequence pair is that crosscorrelation interference is produced at the receiver. However, by an appropriate choice of the initial phase of the sequence, the crosscorrelation interference can be made constructive rather than destructive. FIG. 10 shows a schematic diagram of a differential unipolar-bipolar signaling scheme applicable to any periodic binary sequence.

In a first exemplifying embodiment, an infrared communications system for a wireless local area network comprises a plurality of remote communication terminals, each terminal including a transmitter circuit having means for generating and encoding signature sequences for spread spectrum communication techniques, a means for transmitting coded infrared signals and a receiver circuit for receiving coded infrared signals having means for decoding signature sequences in a spread spectrum communication system.

In this embodiment each remote communication terminal comprises an infrared transceiver that can use either the transmitter and receiver pair shown in FIGS. 3 and 4, respectively, or the transmitter and receiver pair shown in FIGS. 6 and 7, respectively. For the transceiver implemented according to FIGS. 3 and 4, binary data is fed into a 1:k multiplexer from which the k−1 MSB are used to chose one from K sequences which may or may not be complemented by the LSB. The code set is chosen from a set of Orthogonal Structured Codes. The symbol waveform thus generated is used to intensity modulate a lightwave source such as a Light Emitting Diode or a Laser Diode. At the receiver a photosensitive detector, for example, a photodiode or an array of photodiodes, detects the lightwave signal. The resulting photocurrent is amplified and a bank of K-correlators generates K matched filter samples. The K samples are fed into a maximum likelihood detector circuit that detects the k transmitted data bits and converts them into a single serial bit stream, which is an estimate of the transmitted data. Each receiver contains a means of synchronisation that aligns the received signal with the locally generated spreading sequences used in the bank of K-correlators.

For the transceiver implemented according to FIGS. 6 and 7, unipolar binary data D(t) is fed into an 1:k multiplexer. The k−1 MSB feed two distinct code sets that are mutually orthogonal; i.e. code set $\{\Phi\}^c$ and $\{\Phi\}^s$ where $\{\Phi\}^c$ is orthogonal to $\{\Phi\}^s$. The k−1 MSB are used to chose one from K sequences in both code sets denoted by $\{\Phi_n^{(j)}\}^c$ and $\{\Phi_n^{(j)}\}^s$. The LSB when logic "Hi" will not complement $\{\Phi_n^{(j)}\}^c$ but will complement $\{\Phi_n^{(j)}\}^s$ and visa versa when the LSB is logic "Lo". Each symbol waveform is used to intensity modulate a separate lightwave source such as a Light Emitting Diode or a Laser Diode. The differential symbol waveform is formed by summation of the parallel symbol waveforms in the lightwave medium. Alternatively, the parallel symbol waveforms can be summed prior to electro-optic conversion and the resulting differential symbol waveform used to drive a single lightwave source. At the receiver a photosensitive detector, for example a photodiode or an array of photodiodes, detects the lightwave signal. The resulting photocurrent is amplified and a bank of K differential correlators generate K matched filter samples. A differential correlator consists of two parallel correlators, one for each possible pair of symbol waveforms, whose outputs are subtracted. The K samples are fed into a maximum likelihood detector circuit that detects the k transmitted data bits and converts them into a single serial bit stream, which is an estimate of the transmitted data. Each receiver contains a means of synchronisation that aligns the received signal with the locally generated spreading sequences used in the bank of K differential correlators.

The advantages of the techniques used in the above embodiment are:

(1) When combined with M-ary bi-orthogonal keying, sets of Orthogonal Structured Codes give bandwidth efficient modulation schemes that are robust against narrow band interference and multipath propagation effects.

(2) When differential unipolar-bipolar signaling is embedded within a lightwave spread spectrum communication system then common mode interfering signals are removed. In a lightwave spread spectrum system this has the advantage of removing the DC offset caused by the sequence imbalance. In a wireless lightwave spread spectrum system this has the added advantage of reducing the degradation in system performance caused by interference from ambient artificial light.

(3) When used as direct spreading sequences, sets of Orthogonal Structured Codes remain orthogonal under multipath condition and in general possess excellent autocorrelation and crosscorrelation properties.

(4) When used as direct spreading sequences, sets of Orthogonal Structured Codes aid synchronisation between transceiver pairs because they form Complementary Sets.

In a second exemplifying embodiment, a radio communication system for a wireless local area network comprises a plurality of remote communication terminals, each terminal including a transmitter circuit having means for generating and encoding signature sequences for spread spectrum communication techniques, a means for transmitting coded radio signals and a receiver circuit for receiving coded radio signals having means for decoding signature sequences in a spread spectrum communication system.

In this embodiment, each remote communication terminal comprises a radio transceiver that uses the transmitter and receiver pair shown in FIGS. 1 and 2, respectively. At the transmitter, binary data is fed into a 1:k multiplexer from which the k−1 MSB are used to chose one from K sequences that may or may not be complemented by the LSB. The code set is chosen from a set of Orthogonal Structured Codes. The symbol waveform generated modulates a radiowave carrier for transmission. At the receiver, the radiowave signal is detected via an antenna and subsequently is demodulated in order to remove the radiowave carrier. A bank of K-correlators generate K matched filter samples. The K samples are fed to a maximum likelihood detector circuit that detects the k transmitted data bits and converts them into a single serial bit stream, which is an estimate of the transmitted data. Each receiver contains a means of synchronisation that aligns the received signal with the locally generated spreading sequences used in the bank of K-correlators.

The advantages of the techniques used in the above embodiment are:

(1) When combined with M-ary bi-orthogonal keying, sets of Orthogonal Structured Codes give bandwidth efficient modulation schemes that are robust against narrow band interference and multipath propagation effects.

(2) When used as direct spreading sequences, sets of Orthogonal Structured Codes remain orthogonal under multipath condition and in general possess excellent autocorrelation and crosscorrelation properties.

(3) When used as direct spreading sequences, sets of Orthogonal Structured Codes aid synchronisation between transceiver pairs because they form Complementary Sets.

In the above embodiment, common mode interfering signals can be removed by embedding a differential signaling scheme within a radiowave spread spectrum system based on the architectures shown in FIGS. 6 and 7.

In a third exemplifying embodiment, a radio code division multiple access (CDMA) communication system for use, for example, in cellular mobile radio networks, wireless local loop networks, radio packet data networks or satellite networks comprises a plurality of remote communication terminals that send and receive radio signals to and from, respectively, a central base station. Each remote terminal has a transmitter circuit having means for generating and encoding signature sequences for CDMA communication techniques, a means for transmitting coded radio signals and a receiver circuit for receiving coded radio signals having means for decoding signature sequences in a CDMA communication system. Each base station has transmitter circuits having means for generating and encoding signature sequences for CDMA communication techniques, a means for transmitting coded radio signals and receiver circuits for receiving coded radio signals having means for decoding signature sequences in a radio CDMA communication system.

This embodiment generally consists of a centralised access point, connected to a fixed network, and a number of remote terminals within the area of coverage of the access point. This network topology is typical of a cellular mobile radio network, a wireless local loop network or a packet data radio network. Usually, frequency division duplexing is used to separate the uplink and downlink transmissions. However, within either the uplink or downlink, separation between communication channels is achieved by code division multiple access. The downlink transmitter uses the binary data of a user to sequence inverse key an Orthogonal Structured Code. This process ensures that each user within a cell is orthogonal to every other user within the cell when a full set of Orthogonal Structured Codes are used. A significant advantage of using Orthogonal Structured Codes as opposed to Walsh codes in this application is that the Orthogonal Structured Codes remain orthogonal in multipath where as Walsh codes do not. After sequence inverse keying the symbol waveform modulates a radiowave carrier for transmission. The downlink receiver reverses the operations performed by the downlink transmitter. The radiowave signal is detected by an antenna and demodulated in order to remove the radiowave carrier. The resulting signal consists of the signals intended for all users in the cell. A user's data is recovered by using a matched filter detector matched to the corresponding Orthogonal Structured Code.

A user's uplink transmitter is based on the architecture shown in FIG. 1, that is an M-ary bi-orthogonal keying scheme. Binary data is fed into a 1:k multiplexer from which the k−1 MSB are used to chose one from K sequences which may or may not be complemented by the LSB. The code set is chosen from a set of Orthogonal Structured Codes. The symbol waveform generated modulates a radiowave carrier for transmission. A user's uplink receiver is based on the architecture shown in FIG. 2. The radiowave signal is detected by an antenna and demodulated in order to remove the radiowave carrier. A bank of K-correlators generate K matched filter samples. The K samples are fed to a maximum likelihood detector circuit that detects the k data bits and converts them into a single serial bit stream which is an estimate of the transmitted data. Each receiver contains a means of synchronisation that aligns the received signal with the locally generated spreading sequences used in the bank of K-correlators.

The advantages of the techniques used in the above embodiment are:

(1) When combined with M-ary bi-orthogonal keying, sets of Orthogonal Structured Codes give bandwidth efficient modulation schemes that are robust against narrow band interference and multipath propagation effects.

(2) When used as direct spreading sequences, sets of Orthogonal Structured Codes remain orthogonal under multipath condition and in general possess excellent autocorrelation and crosscorrelation properties.

(3) When used as direct spreading sequences, sets of Orthogonal Structured Codes aid synchronisation between transceiver pairs because they form Complementary Sets.

In the above embodiment, common mode interfering signals can be removed by embedding a differential signaling scheme within a radiowave spread spectrum system based on the architectures shown in FIGS. 6 and 7. This can be done on both the uplink and downlink.

In a fourth exemplifying embodiment, a lightwave CDMA communication system for an optical fibre local area network comprises a plurality of remote communication terminals that transmit and receive lightwave signals and which are interconnected by optical fibre. Each terminal has a transmitter circuit having means for generating and encoding signature sequences for lightwave CDMA communication techniques, a means for transmitting coded lightwave signals and a receiver circuit for receiving coded lightwave signals having means for decoding signature sequences in a lightwave CDMA communication system.

The term "lightwave" is taken to mean electromagnetic radiation within the ranges of visible light and near and far infrared light.

In this embodiment each communication terminal comprises a lightwave transceiver based on the transmitter and receiver architecture shown in FIG. 5. In general, lightwave transceivers are interconnected by a shared lightwave medium such as optical fibre. At the transmitter binary data is converted from a single serial bit stream into two parallel differential bit streams consisting of the original data and its inverse. Each differential bit stream sequence inverse keys a unique spreading code where each unique spreading code is chosen from a set of Orthogonal Structured Codes. Each differential spread spectrum signal then intensity modulates an individual lightwave source, for example a Light Emitting Diode or a Laser Diode. The two emitted lightwave signals sum on the lightwave transmission medium to produce a differential spread spectrum signal. In an alternative arrangement the two parallel spread spectrum signals are first summed and the summand intensity modulates a single lightwave source. At the receiver a photosensitive detector, for example a photodiode, detects the lightwave signal. The resulting photocurrent is amplified and a differential correlator generates a matched filter sample. The sample is fed to a binary threshold detector circuit that detects the serial bit stream, which is an estimate of the transmitted data. It should be noted that a differential signaling scheme may use any code pair to spread the differential data providing that the sequences used have the same {1,0} chip imbalance (see FIG. 10). Each receiver contains a means of synchronisation that aligns the received signal with the locally generated spreading sequences used in the correlator.

The advantages of the techniques used in the above embodiment are:

(1) When differential unipolar-bipolar signaling is embedded within a lightwave spread spectrum communication system then common mode interfering signals are removed. In a lightwave CDMA system this has the advantage of removing the DC offset caused by sequence imbalance.

(2) When used as direct spreading sequences, sets of Orthogonal Structured Codes possess excellent autocorrelation and crosscorrelation properties. Specifically, when synchronised, the sequences will support N users where N is the set size as well as remove the near/far effect.

(3) When used as direct spreading sequences, sets of Orthogonal Structured Codes aid synchronisation between transceiver pairs because they form Complementary Sets.

The sequences presented hereinabove represent a significant development in signature sequences for spread spectrum communication techniques. For example, Orthogonal Structured Codes combine properties of orthogonality for certain well defined cyclical shifts with small autocorrelation and crosscorrelation values for other cyclical shifts. These properties make Orthogonal Structured Codes ideal spreading sequences in a direct sequence spread spectrum system. Specifically, when synchronised Orthogonal Structured Codes can give a spectral efficiency of 100% while obviating the near/far effect in a non-dispersive channel. However, in a dispersive channel Orthogonal Structured Codes remain orthogonal unlike the Walsh codes. Significantly, the algorithm described herein is capable of systematically constructing multiple sets of orthogonal sequences for most practical code lengths and beyond. That is, two or more sets of Orthogonal Structured Codes can be constructed for a given sequence length N. The implication being that such code sets may be used in parallel in order to give a substantial increase in the capacity of a spread spectrum communication system. In addition, a very useful property of Orthogonal Structured Codes is that they form Complementary Sets of sequences. That is, the aperiodic autocorrelation function of all sequences in a set of Orthogonal Structured Codes sum to zero for every time shift, except the zero shift.

Figure 11:
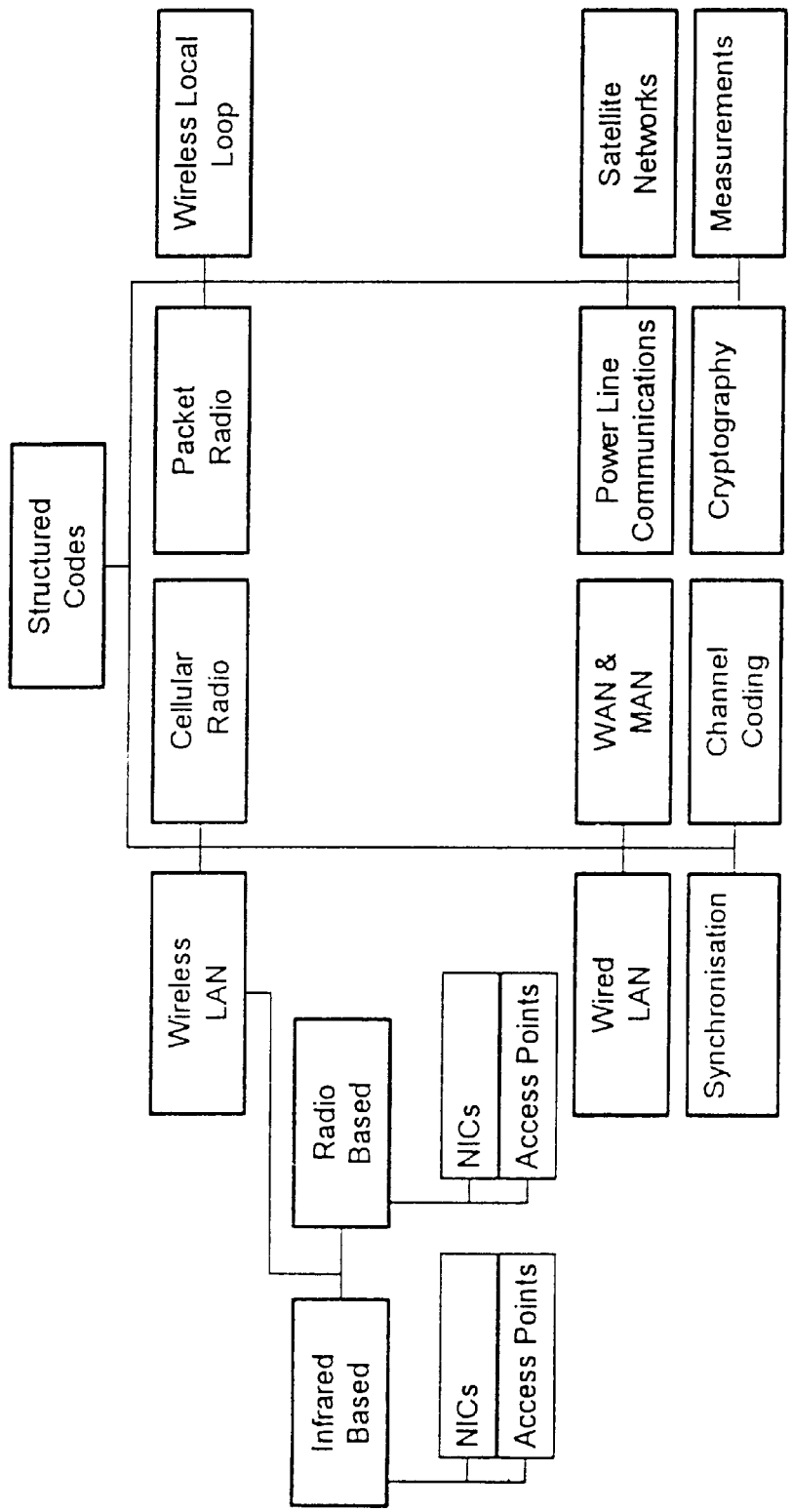
FIG. 11 is a chart illustrating some of the applications to which the structured signature sequences of the present invention may advantageously be applied.

It will be seen that the application of these sequences is not limited to infrared wireless communication but may be applied to a wide range of communication techniques which include radiowave as well as lightwave techniques and fixed as well as wireless techniques. A sample application tree is illustrated in FIG. 11. Other communication systems that would particularly benefit from the sequences are cellular mobile radio networks, wireless local loop networks, radio packet data networks, satellite networks and radio local area networks. The use of Structured Codes, specifically Orthogonal Structured Codes, facilitates higher throughput of data for a given bandwidth allowing either a greater number of users or higher data rates for each channel.

Another contribution of the present invention is the disclosure of new M-ary digital transmission architectures based on Orthogonal Structured Codes. These M-ary architectures combine spectrum spreading with orthonormal basis functions to realise bandwidth efficient transmission schemes that are robust to interference and multipath propagation effects. General architectures relevant to any spread spectrum or CDMA communication system and specific architectures relevant to infrared wireless systems, radio systems and optical fibre systems are disclosed. In addition, transceiver architectures based on combining independent sets of Orthogonal Structured Codes are disclosed. Theses architectures can at least double the capacity of conventional spread spectrum communication systems.

The further contribution to the art is that of differential unipolar-bipolar signalling. This signalling scheme removes the sequence dependent off-set associated with unipolar-bipolar signalling and allows any family of binary signature sequences to be used in a lightwave (unipolar) transmission system. Differential unipolar-bipolar signalling uses code division of differential data on a single transmission channel. Code division is ideally achieved using Orthogonal Structured Codes, however, any binary code pair can be used providing they have the same {1,0} imbalance.

The sequences are generated by a combination of sequence modulation and concatenation of a selected seed set of sequences. When the seed set is orthogonal then the set of Structured Codes constructed is also orthogonal. Furthermore, by adopting different Addition tables, other sets of Structured Codes can be constructed.

Using Orthogonal Structured Codes to provide orthonormal basis function while spreading the spectrum at the same time is a significant development in the art of M-ary digital transmission. By combining two or more distinct sets of Orthogonal Structured Codes, spread spectrum communication systems with significantly enhanced capacities can be realised.

The use of code division to separate differential data on a single unipolar (lightwave) transmission channel is provided by the differential unipolar-bipolar signaling scheme presented above with reference to FIGS. 5 and 10. The realisation of code-division using any binary sequence and not just orthogonal sequences is a significant development as is the incorporation of a differential unipolar-bipolar signaling scheme into an M-ary digital transmission scheme based on Orthogonal Structured Codes.

In addition, the Structured Codes presented have beneficial applications in error correction/detection, synchronisation, cryptography, power-line communications, ranging and tomography.

The new Structured Codes disclosed in this document have been named Supergold codes and their application to specific systems has been named Supergold coding.

It will be understood that the current invention is not limited to the electromagnetic radiation based carriers such as lightwave carriers (e.g. infrared or visible light) or radio frequency carriers but may be implemented using any suitable carrier. Such suitable alternatives may include, but are not limited to the use of sonic or seismic media in response to a given application requirement.

It will also be understood that the mathematical techniques described throughout this specification in relation to the relative manipulation of row and column elements may be varied to obtain the same result. For example in the treatment of the case where the seed set is square (m=w) described above.

It will of course be understood that the invention is not limited to the specific details described herein, which are given by way of example only, and that various modification and alterations are possible within the scope of the invention.

What is claimed is:

1. A method for spread spectrum communication using a signature sequence, the signature sequence being generated by performing the steps of:

selecting a seed set of sequences of a given size having a plurality of inner sequences;

generating a plurality of cosets from the seed set of sequences by multiplying in turn each inner sequence by an element of an associated sequence;

constructing a subset of sequences by concatenating the sequences of a coset; and constructing a full set of sequences by concatenating subsets of sequences.

2. The method of claim 1, wherein:

the seed set contains binary sequences.

3. The method of claim 2, wherein:

the binary sequence is cyclically distinct, quasi-balanced and satisfies the optimal periodic autocorrelation condition.

4. The method of claim 1, wherein:

the seed set contains complex sequences.

5. The method of claim 1, wherein:

the seed set is orthogonal.

6. The method of claim 1, wherein:

the subset of sequences is constructed by concatenating the sequences of a coset using an addition table.

7. The method of claim 6, wherein:

the addition table is constructed using powers of a primitive root of the seed set of sequences, the primitive root being determined in accordance with the size of the seed set.

8. The method of claim 6, wherein:

the addition table is constructed using powers of a primitive element of the seed set of sequences, the primitive element being determined in accordance with the size of the seed set.

9. The method of claim 1, wherein:

the seed set is formed from a plurality of rotated sequences.

10. A method for producing a structured code for use in spread spectrum data communication, comprising the steps of:

selecting a seed set of sequences of a given size having a plurality of inner sequences;

generating a plurality of cosets from the seed set of sequences by multiplying in turn each inner sequence by an element of an associated sequence;

constructing a subset of sequences by concatenating the sequences of a coset; and constructing a full set of sequences by concatenating subsets of sequences.

11. The method of claim 10, wherein:

the seed set contains binary sequences.

12. The method of claim 11, wherein:

the binary sequence is cyclically distinct, quasi-balanced and satisfies the optimal periodic autocorrelation condition.

13. The method of claim 11, wherein:

the seed set contains complex sequences.

14. The method of claim 10, wherein:

the seed set is orthogonal.

15. The method of claim 10, wherein:

the subset of sequences is constructed by concatenating the sequences of a coset using an addition table.

16. The method of claim 15, wherein:

the addition table is constructed using powers of a primitive root of the seed set of sequences, the primitive root being determined in accordance with the size of the seed set.

17. The method of claim 15, wherein:

the addition table is constructed using powers of a primitive element of the seed set of sequences, the primitive element being determined in accordance with the size of the seed set.

18. The method of claim 10, wherein:

the seed set is formed from a plurality of rotated sequences.

19. An apparatus for constructing and encoding signature sequences for spread spectrum communication techniques, comprising:

a seed set generating means for constructing a seed set of sequences having a plurality of inner sequences;

a coset generating means for generating cosets of sequences by multiplying in turn each inner sequence by an element of an associated sequence;

an expansion means for concatenating sequences of a generated coset according to a predetermined order, to form a subset of sequences for each coset; and a set generating means for constructing a full set of sequences by concatenating subsets.

20. The apparatus of claim 19, wherein:

the seed set generating means comprises a plurality of shift registers, each shift register having an input, a system clock input, logic gates, a plurality of register cells/stages and an output to form a sequence of the seed set.

21. The apparatus of claim 19, wherein:

the seed set generating means includes a number of linear feedback shift registers.

22. The apparatus of claim 19, wherein the expansion means comprises:

a plurality of inputs, each input corresponding to a sequence from a coset;

a plurality of multiplexers having associated counters and logic gates;

a system clock input; and a plurality of outputs to form a subset of sequences.

23. An apparatus in accordance with claim 19 for decoding signature sequences in a spread spectrum communications system, comprising:

means for receiving coded signals;

means for generating sequence functions;

means for combining received coded signals with sequence functions to produce despread signal outputs;

means for combining the despread signal outputs to generate a data stream; and logic circuitry for analysing the data stream.

24. A data transmission system, comprising:

a transmitter and a receiver, the transmitter incorporating means for transmitting data using a signature sequence and the receiver formed for receiving and decoding data transmitted using a signature sequence, the signature sequence being generated by performing the steps of:

selecting a seed set of sequences of a given size;

generating a plurality of cosets from the seed set of sequences;

constructing a subset of sequences by concatenating the sequences of a coset; and constructing a full set of sequences by concatenating subsets of sequences.

25. An electromagnetic radiation or sonic communications system for a communications network comprising a plurality of remote communication terminals, each terminal including a transmitter circuit having means for generating and encoding signature sequences for spread spectrum communication techniques by performing the steps of:

selecting a seed set of sequences of a given size having a plurality of inner sequences, generating a plurality of cosets from the seed set of sequences by multiplying in turn each inner sequence by an element of an associated sequence, constructing a subset of sequences by concatenating the sequences of a coset and constructing a full set of sequences by concatenating subsets of sequences, the transmitter circuit also having, a means for transmitting coded signals and a receiver circuit for receiving coded signals the receiver circuit having means for decoding signature sequences in a spread spectrum communication system.

26. The system of claim 25, wherein:
the communications network uses a radio frequency carrier.

27. The system of claim 25, wherein:
the communications network uses an ultrasound carrier.

28. The system of claim 25, wherein:
the communications network uses a seismic carrier.

29. The system of claim 25, wherein:
the communications network uses a lightwave carrier.

30. The system of claim 29, wherein:
the communications network uses an infrared carrier.

31. The system of claim 29, wherein:
the receiver circuit incorporates a photodetector, the photodetector having an associated coupling means communicating with a receiver preamplifier.

32. The system of claim 31, wherein:
the coupling means is formed for differential signal recognition.

33. The system of claim 25, wherein:
the seed set is a balanced seed set.

34. The system of claim 25, wherein:
the encoding signature sequences incorporates orthogonal structured codes.

* * * * *